(12) United States Patent
Oki et al.

(10) Patent No.: US 12,000,349 B2
(45) Date of Patent: Jun. 4, 2024

(54) CONTROL DEVICE

(71) Applicant: Hitachi Astemo, Ltd., Hitachinaka (JP)

(72) Inventors: Kotaro Oki, Hitachinaka (JP); Osamu Mukaihara, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 0 days.

(21) Appl. No.: 17/925,736

(22) PCT Filed: Feb. 5, 2021

(86) PCT No.: PCT/JP2021/004248
§ 371 (c)(1),
(2) Date: Nov. 16, 2022

(87) PCT Pub. No.: WO2021/240892
PCT Pub. Date: Dec. 2, 2021

(65) Prior Publication Data
US 2023/0193843 A1 Jun. 22, 2023

(30) Foreign Application Priority Data

May 27, 2020 (JP) ................................. 2020-092002

(51) Int. Cl.
*F02D 41/00* (2006.01)
*F01L 1/344* (2006.01)
*F01L 13/00* (2006.01)

(52) U.S. Cl.
CPC ............ *F02D 41/009* (2013.01); *F01L 1/344* (2013.01); *F01L 2013/111* (2013.01);
(Continued)

(58) Field of Classification Search
CPC ................. F01L 1/344; F01L 2013/111; F01L 2013/113; F01L 2201/00; F01L 2800/14;
(Continued)

(56) References Cited

U.S. PATENT DOCUMENTS 5,462,022 A * 10/1995 Ushida ................ F02D 13/0238
123/90.31
2003/0093214 A1 5/2003 Jankovic et al.
(Continued)

FOREIGN PATENT DOCUMENTS

JP 8-312443 A 11/1996
JP 2001-20707 A 1/2001
(Continued)

OTHER PUBLICATIONS

International Search Report (PCT/ISA/210) issued in PCT Application No. PCT/JP2021/004248 dated May 11, 2021 with English translation (six (6) pages).
(Continued)

*Primary Examiner* — Jorge L Leon, Jr.
(74) *Attorney, Agent, or Firm* — Crowell & Moring LLP

(57) ABSTRACT

To provide a control device capable of calculating a cam phase equal to an actual cam angle even when a corresponding cam angle signal detection range is exceeded by changing a cam phase by a variable valve mechanism. In addition to the conventional cam angle measuring function, a cam angle measuring means for advancing or retarding beyond a cam angle measurement reference position, and a means for determining that the cam angle signal advances or retards beyond the cam angle measurement reference position are provided. By switching the cam angle measuring function according to a determination result as to whether the cam angle signal exceeds the cam angle measurement reference position, it is possible to improve the time resolution of the angle measurement while maintaining the cam phase change amount at the same wide angle as the conventional one.

7 Claims, 18 Drawing Sheets

(52) U.S. Cl.
CPC ...... *F01L 2013/113* (2013.01); *F01L 2201/00* (2013.01); *F01L 2800/14* (2013.01); *F01L 2820/041* (2013.01); *F01L 2820/042* (2013.01)

(58) Field of Classification Search
CPC .......... F01L 2820/041; F01L 2820/042; F02D 41/009
USPC ...................................................... 123/90.15
See application file for complete search history.

(56) References Cited

U.S. PATENT DOCUMENTS

| | | | | |
|---|---|---|---|---|
| 2004/0206321 | A1* | 10/2004 | Katayama | F01L 1/3442 |
| | | | | 123/90.15 |
| 2005/0160803 | A1* | 7/2005 | Adachi | F02D 41/009 |
| | | | | 73/114.26 |
| 2013/0206089 | A1* | 8/2013 | Kameda | F01L 1/34409 |
| | | | | 123/90.17 |
| 2019/0249574 | A1 | 8/2019 | Shimizu | |

FOREIGN PATENT DOCUMENTS

| | | |
|---|---|---|
| JP | 2001-123806 A | 5/2001 |
| JP | 2002-130005 A | 5/2002 |
| JP | 2014-182040 A | 9/2014 |
| JP | 2017-115709 A | 6/2017 |
| JP | 2018-115642 A | 7/2018 |

OTHER PUBLICATIONS

Japanese-language Written Opinion (PCT/ISA/237) issued in PCT Application No. PCT/JP2021/004248 dated May 11, 2021 (three (3) pages).

* cited by examiner

FIG. 1
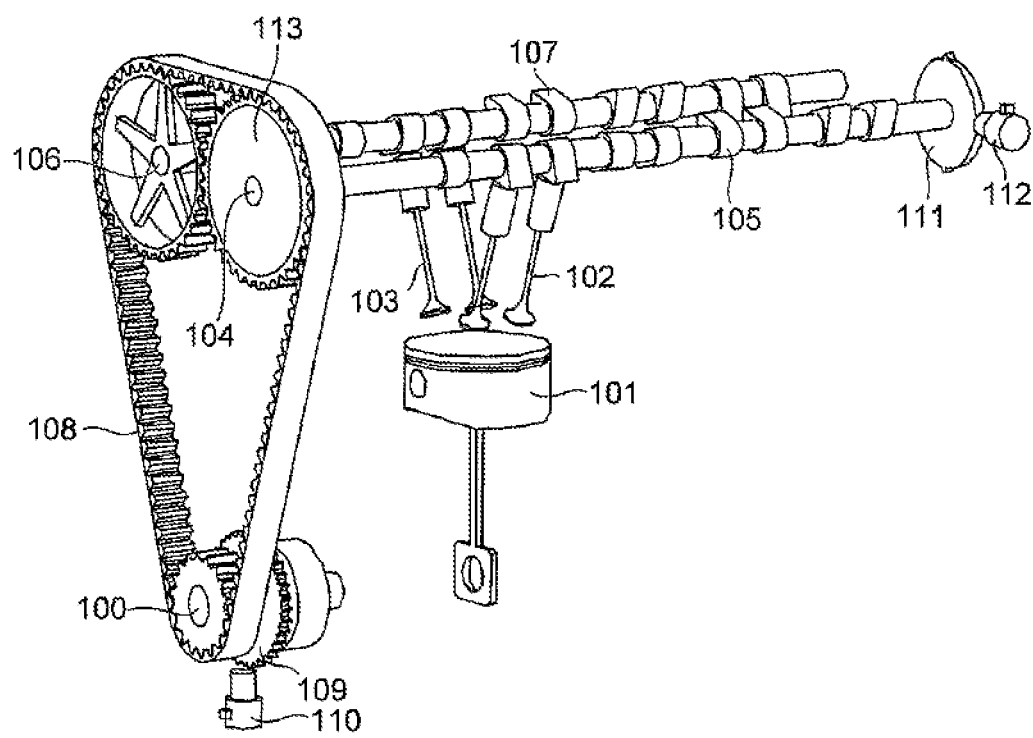
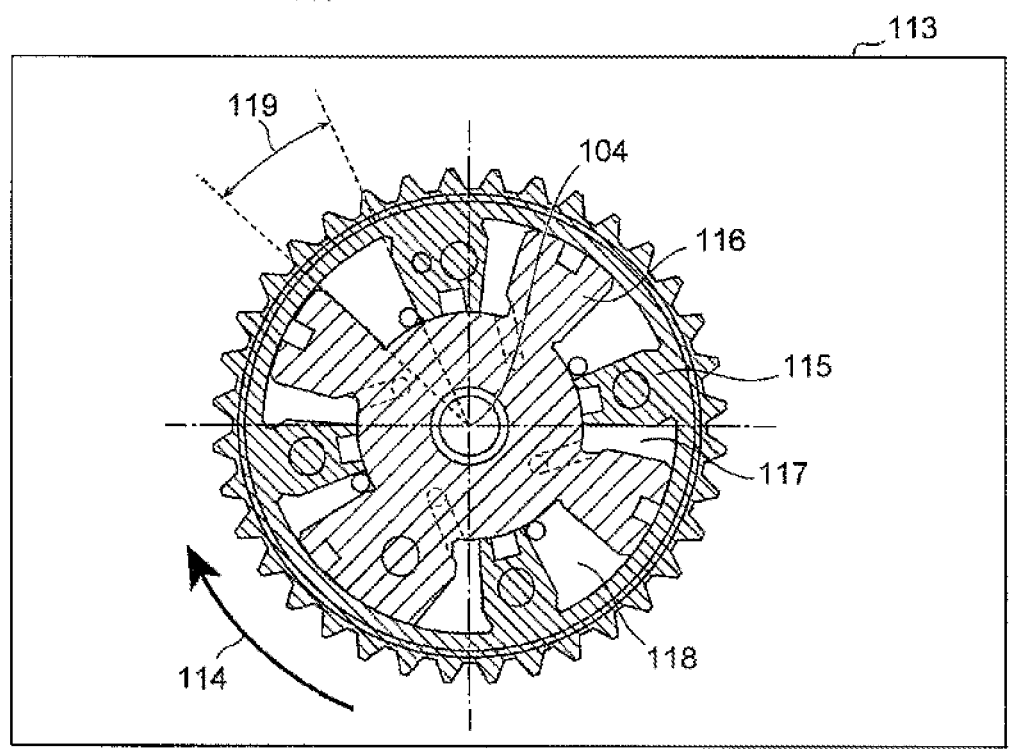

FIG. 5
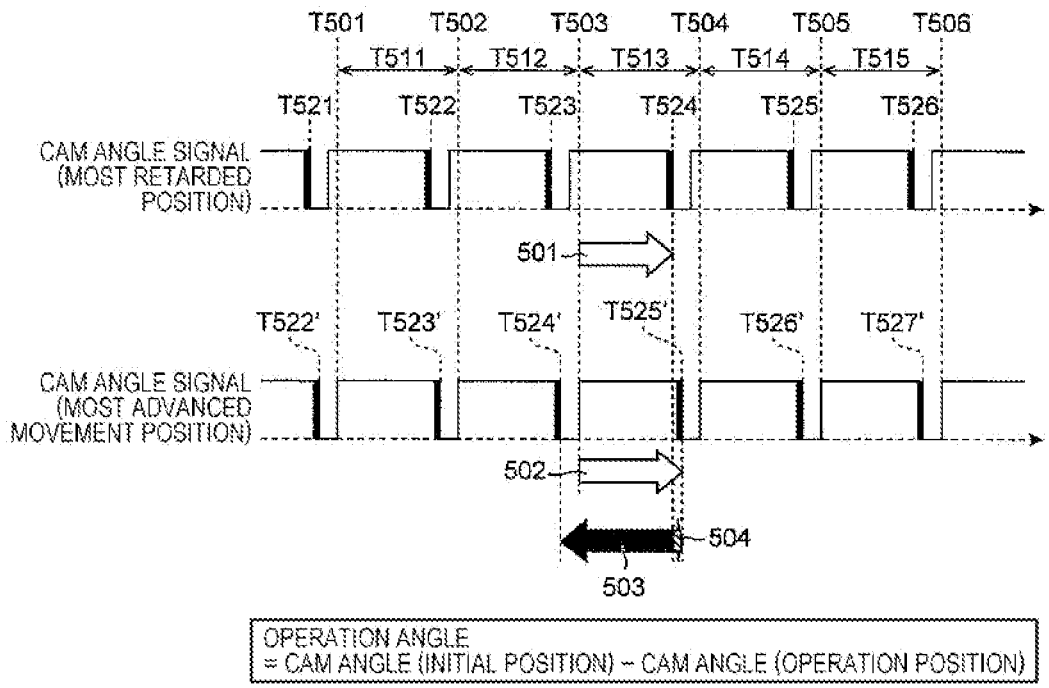
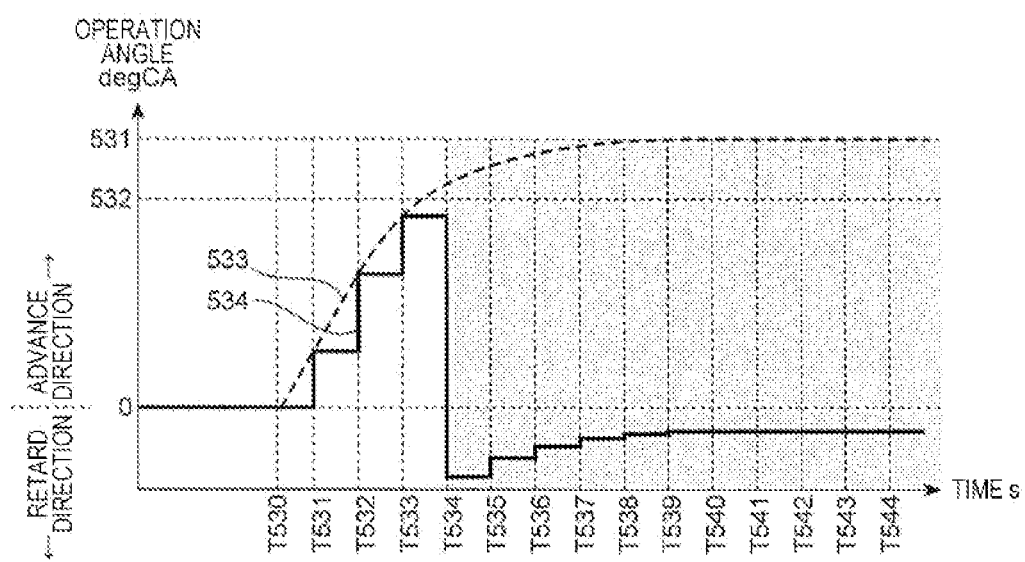

FIG. 6
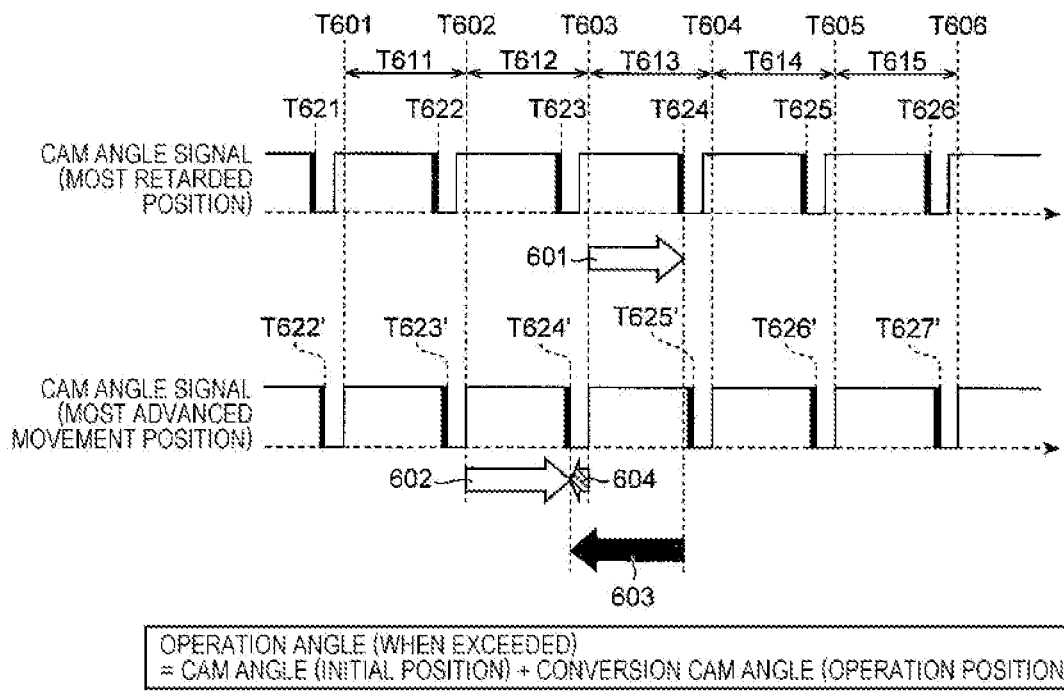
OPERATION ANGLE (WHEN EXCEEDED)
= CAM ANGLE (INITIAL POSITION) + CONVERSION CAM ANGLE (OPERATION POSITION)
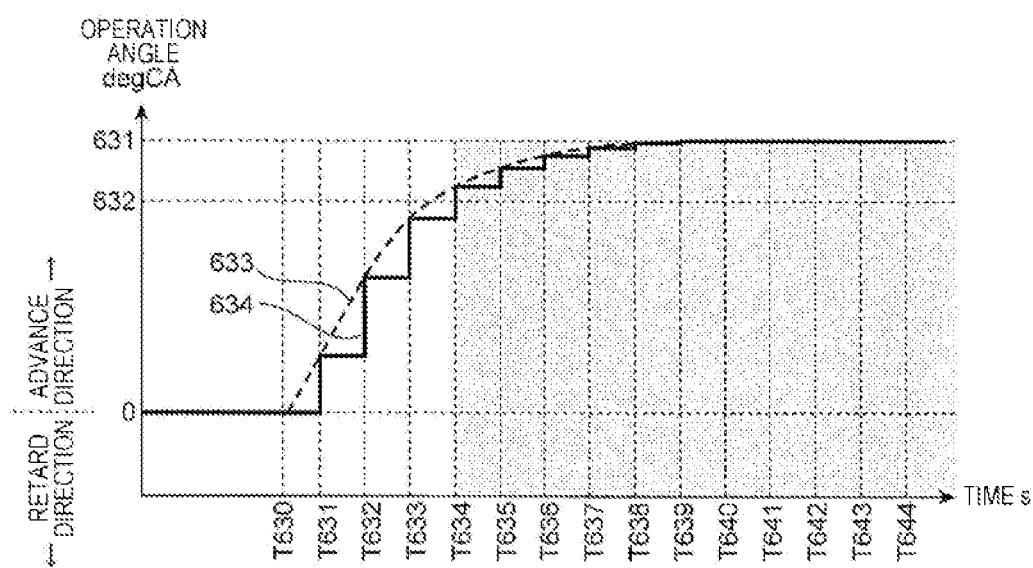

FIG. 8
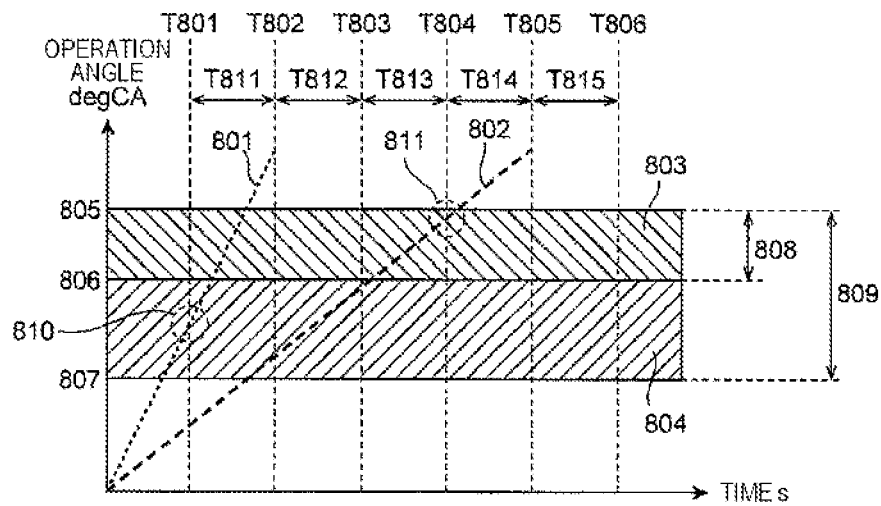
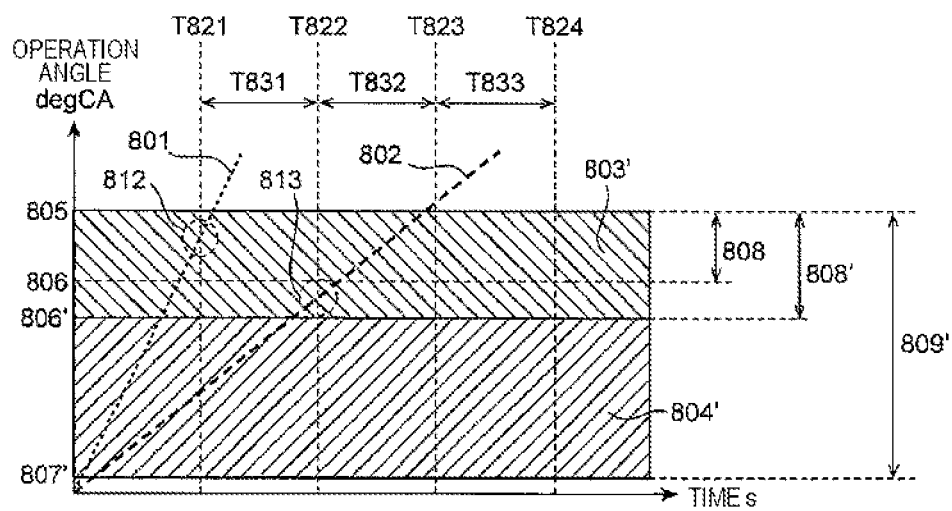
CAM ANGLE SIGNAL DETERMINATION RANGE WIDTH
= VARIABLE VALVE MECHANISM DRIVE SPEED × CAM ANGLE SIGNAL INPUT CYCLE FIG. 16
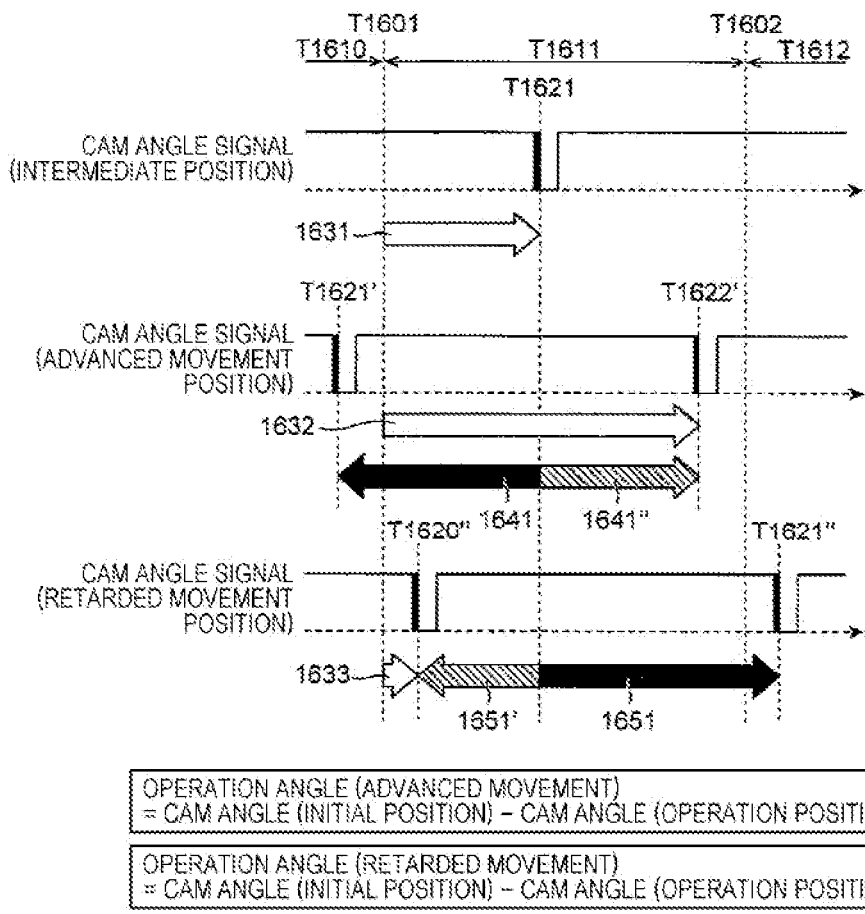
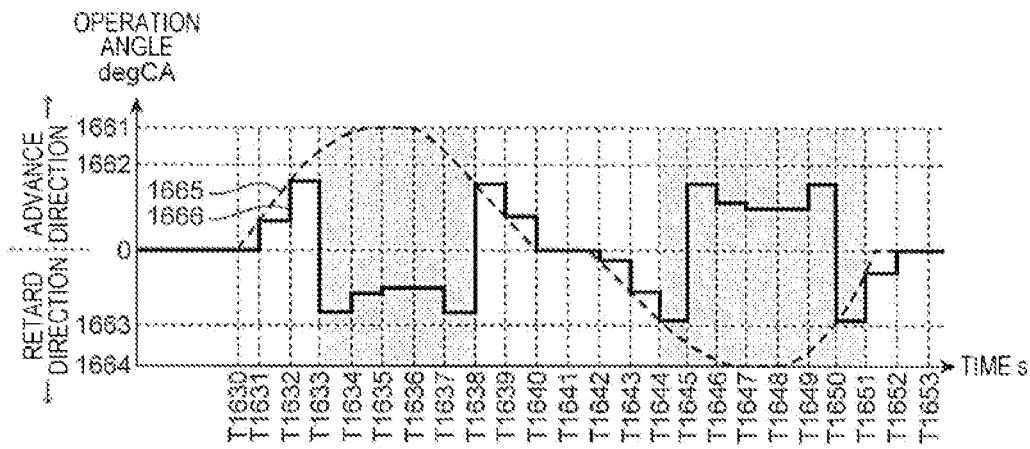

FIG. 18
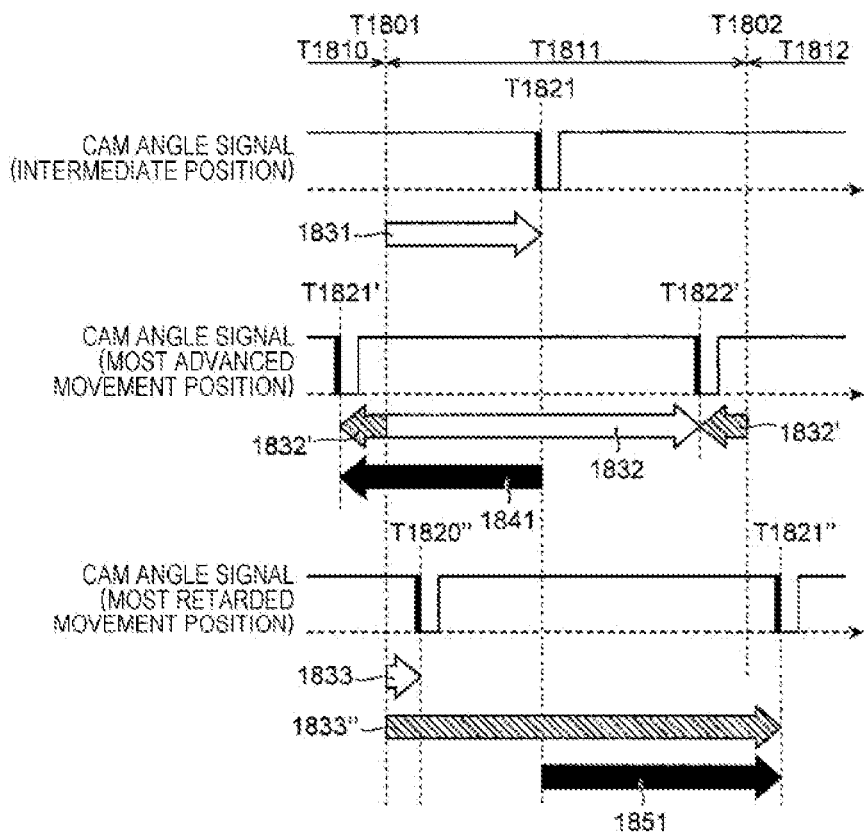
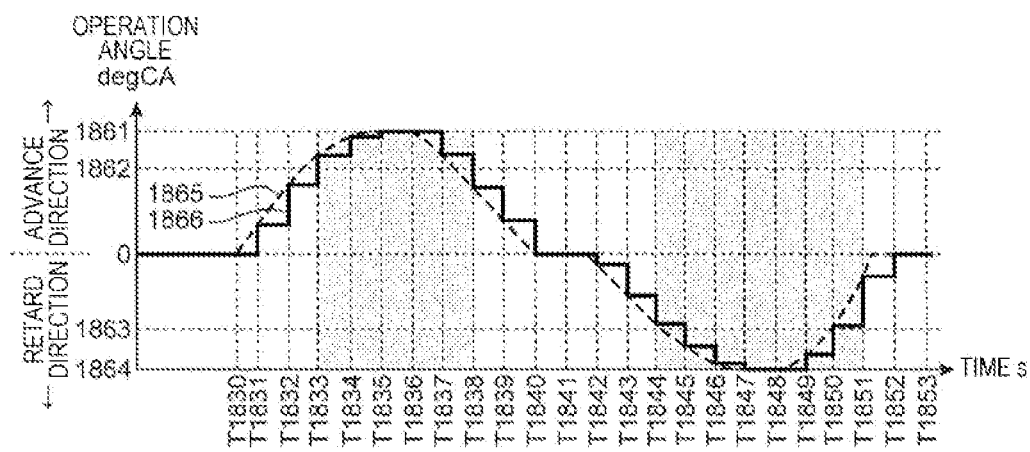

CONTROL DEVICE

TECHNICAL FIELD

The present invention relates to a control device.

BACKGROUND ART

An engine including a variable valve mechanism that varies an opening/closing timing of an intake/exhaust valve according to an engine state for improving fuel consumption is increasing. In the control of the variable valve, the phase change of the detected cam angle signal is fed back to the controller of the variable valve device, and the phase of the cam is controlled to a target phase. PTL 1 discloses a basic idea regarding a measurement method of a cam phase angle.

CITATION LIST

Patent Literature

PTL 1: JP 2001-20707 A

SUMMARY OF INVENTION

Technical Problem

In order to suppress the fluctuation of the EGR gas at the time of transient operation and to respond to a torque control request with high accuracy, a high response of the variable valve mechanism is required. Therefore, for the purpose of improving the measurement time resolution, a cam signal plate having a larger number of teeth than before may be applied.

In the technique of PTL 1, the change angle of the cam phase is calculated in the range of the cylinder phase angle (compression TDC interval of each cylinder). However, when the cam signal plate having a larger number of teeth than before is applied to this technique, a plurality of cam angle signals are detected within the range of the cylinder phase angle, and the change angle of the cam phase cannot be correctly calculated.

In this case, the cam angle signal detection range is set to a narrower angle (for example, an angle obtained by dividing an inter-cycle angle by the number of cam teeth) than the cylinder phase angle, the detection teeth of the cam signal plate and the cam angle signal detection range are made to correspond one to one, and each cam angle signal is independently detected, so that it is possible to avoid detecting a plurality of cam angle signals within one cam angle signal detection range.

However, the cam phase variable range of the variable valve mechanism is determined by various performance requirements of the internal combustion engine different from the above requirements. Therefore, when the angle of the cam phase is advanced or retarded by the variable valve mechanism and the corresponding detection tooth moves beyond the corresponding cam angle signal detection range to the adjacent cam angle signal detection range, there is a possibility that an erroneous cam phase is calculated.

An object of the present invention is to provide a control device capable of calculating a cam phase equal to an actual cam angle even when a corresponding cam angle signal detection range is exceeded by changing a cam phase by a variable valve mechanism.

Solution to Problem

In order to solve the above problem, the present invention includes a control device that determines presence or absence of a sign of an excess operation in which a cam phase changes beyond a cam angle signal detection range, and changes a cam phase angle expression when a cam angle signal is detected outside the cam angle signal detection range in a state where it is determined that there is the sign of the excess operation.

Advantageous Effects of Invention

According to the present invention, even when the cam signal plate having the number of teeth corresponding to the increase in speed of the variable valve mechanism is applied, it is possible to calculate the change amount of the cam phase matching the actual state. Therefore, without narrowing the operation range of the phase angle, it is possible to obtain the fuel consumption improvement and the torque control effect by the intake/exhaust valve opening/closing timing control with high accuracy.

Other features of the invention will be clear from the description and the accompanying drawings. In addition, objects, configurations, and effects besides the above description will be apparent through the explanation on the following embodiments.

BRIEF DESCRIPTION OF DRAWINGS

FIG. 1 is a diagram for explaining a configuration of a variable valve mechanism of an internal combustion engine.

FIG. 5 is a diagram for explaining a problem of a conventional method.

FIG. 6 is a diagram for explaining a method for solving a conventional problem.

FIG. 8 is a diagram for explaining a method for setting a width of a cam angle signal determination range.

FIG. 16 is a diagram for explaining a problem of a conventional method.

FIG. 18 is a diagram for explaining a method for solving a conventional problem.

DESCRIPTION OF EMBODIMENTS

First Embodiment

Figure 2:
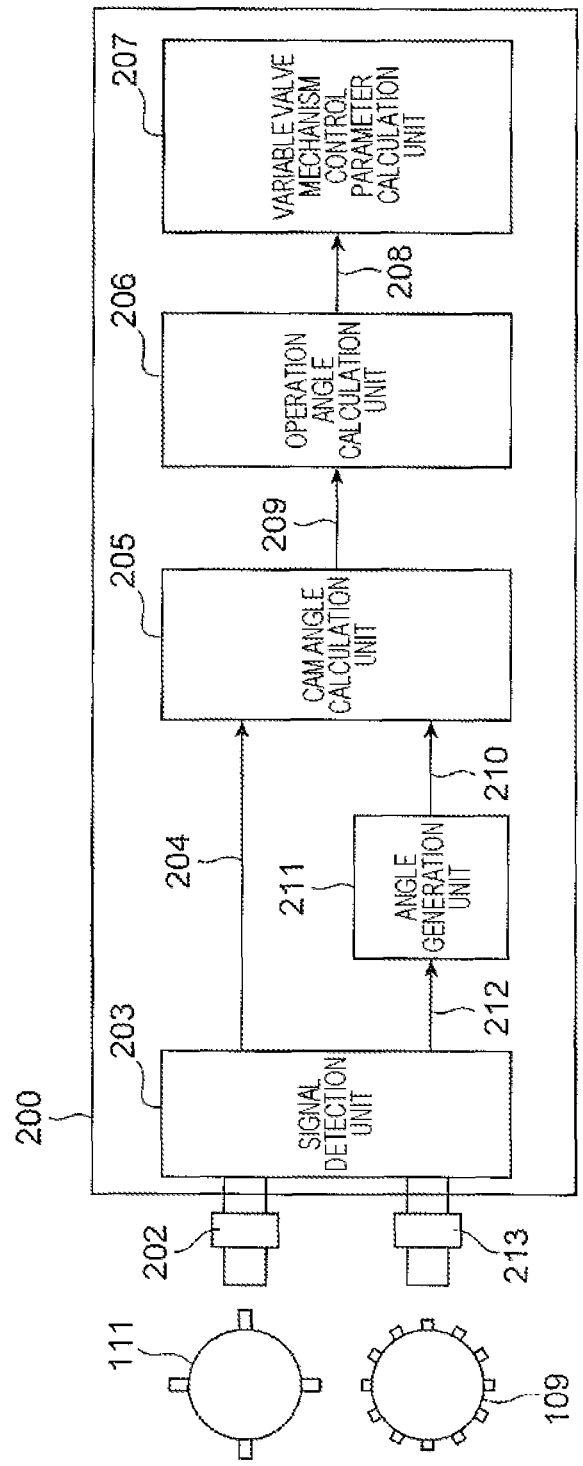
FIG. 2 is a block diagram for explaining a functional configuration of a conventional control device.

An embodiment of a cam angle measuring method according to the present invention will be described with reference to the drawings.

A configuration of an internal combustion engine including a variable valve mechanism will be described with reference to FIG. 1.

The internal combustion engine combusts an air-fuel mixture of fuel and air in a space (cylinder) closed by a piston 101, an intake valve 102, and an exhaust valve 103, and converts volume expansion of combustion gas into rotational motion of a crankshaft 100 connected to the piston 101. The rotation of the crankshaft is transmitted to an intake camshaft 104 and an exhaust camshaft 106 via a timing belt 108 (which may be a timing chain). The intake camshaft 104 and the exhaust camshaft 106 are provided with an intake cam 105 and an exhaust cam 107. When the intake cam 105 pushes down the intake valve 102, the intake passage opens, and air or an air-fuel mixture flows into the cylinder. When the exhaust cam 107 pushes down the exhaust valve 103, the exhaust passage is opened, and the combustion gas is discharged from the cylinder.

A crank angle plate 109 fixed to the crankshaft 100 is provided with detection teeth installed at predetermined intervals, and the rotation angle and the rotation speed of the crankshaft can be recognized by reading the position of the detection teeth as a crank angle signal by a crank angle sensor 110.

A cam angle plate 111 fixed to the intake camshaft 104 is provided with detection teeth installed at predetermined intervals, and the rotation angle and the rotation speed of the camshaft can be recognized by reading a position of the detection teeth as a cam angle signal by a cam angle sensor 112.

In a so-called multi-cylinder internal combustion engine including a plurality of pistons, by combining angle information based on a crank angle signal with the number of times of detection of a cam angle signal and signal state (such as voltage level) information, a cylinder that ignites the air-fuel mixture next is identified (cylinder discrimination).

Since an inertial force acts on the intake air, when the opening/closing timing of the intake valve is at the fixed position, the intake amount of gas changes depending on the engine speed. Therefore, a technique of actively controlling the intake amount by varying the opening/closing timing of the intake valve using a variable valve mechanism 113 is known. The variable valve mechanism 113 mainly includes a cam housing 115 having an unchanging phase and a vane 116 fixed to the camshaft and changing the phase of the camshaft. Some of the variable valve mechanisms 113 are electrically controlled, and some are controlled by hydraulic pressure injected into gaps 117 and 118. When the hydraulic pressure control is taken as an example, it is possible to change the phase of the camshaft in a camshaft rotation direction 114 (advance operation) by supplying the hydraulic pressure to the gap 117 and rotating the vane 116 or to change the phase of the camshaft in the direction opposite to the camshaft rotation direction 114 (retard operation) by supplying the hydraulic pressure to the gap 118 and rotating the vane 116.

The vane 116 has a configuration in which an initial position is determined by a key, a spring force, or the like, and the initial position is placed at the most retarded position and controlled in the advance direction from the most retarded position, or a configuration in which the initial position is placed in the middle of the most retarded position and the most advanced position and controlled in both the advance direction and the retard direction. In the present embodiment, a configuration in which the initial position is placed at the most retarded position and is controlled in the advance direction from the most retarded position will be described as an example, but the present invention is not limited to this configuration.

As a method for controlling the camshaft to the target angle by the variable valve mechanism, feedback control is generally used in which a current cam angle operation amount (operation angle) with respect to the initial position is calculated, and the control amount is adjusted based on a difference from the target angle.

The control device of the present embodiment relates to a technique of calculating an operation angle of a camshaft of a variable valve mechanism and measuring a cam phase.

Next, a configuration of a control function related to conventional operation angle calculation will be described with reference to FIG. 2. FIG. 2 is a functional block diagram for explaining the functional configuration of the conventional control device. This function is provided in an ECU 200 of the internal combustion engine.

In the conventional control, the output of a crank angle sensor 213 is detected by a signal detection unit 203, and crank angle information 210 used for the cam angle calculation is calculated by an angle generation unit 211 based on the detected crank angle signal 212. The signal detection unit 203 detects an output of a cam angle sensor 202, and outputs a cam angle signal 204.

A cam angle calculation unit 205 has a measurement reference position angle of the cam angle in the crank angle information 210, and calculates a cam angle 209 from the crank angle information 210 when the cam angle signal 204 is input with respect to the measurement reference position angle.

An operation angle calculation unit 206 has information on the cam angle at the initial position, and calculates an operation angle 208 of the camshaft by comparing the cam angle 209 calculated by the cam angle calculation unit 205 with the cam angle at the initial position. The operation angle 208 is used by a variable valve mechanism control parameter calculation unit 207 to calculate a control parameter of the variable valve mechanism. Then, the control parameter calculated by the variable valve mechanism control parameter calculation unit 207 is used for feedback control to a target angle which is control of the variable valve mechanism.

Figure 3:
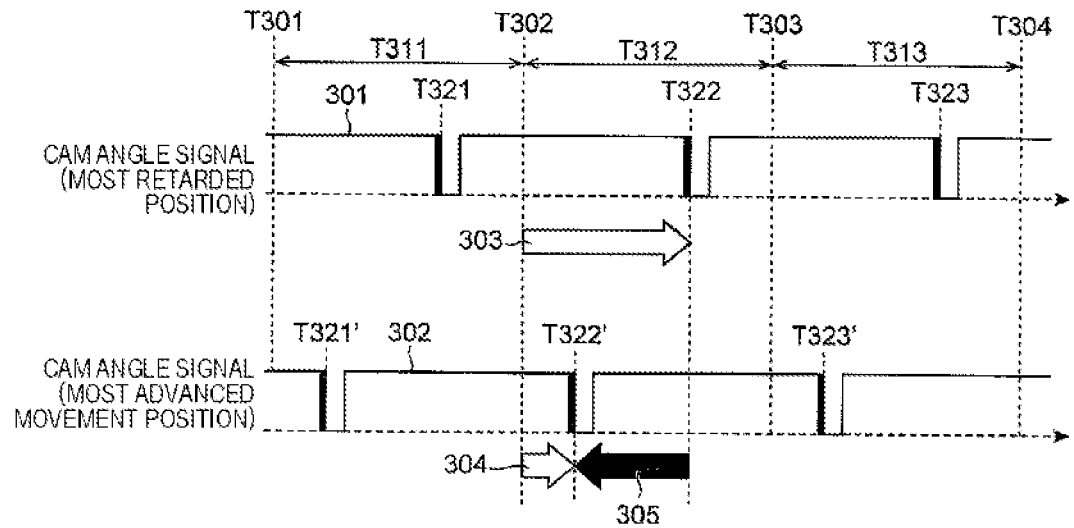
FIG. 3 is a diagram for explaining a conventional operation angle measuring method.

Calculation contents of the cam angle calculation unit 205 and the operation angle calculation unit 206 in FIG. 2 will be specifically described with reference to FIG. 3. FIG. 3 is a diagram for explaining a conventional operation angle measuring method.

FIG. 3 is a diagram for explaining a conventional operation angle measuring method, in which a horizontal axis represents time and a vertical axis represents a cam angle signal. The upper part of FIG. 3 illustrates a detection example 301 of the cam angle signal at the most retarded position, and the lower part of FIG. 3 illustrates a detection example 302 of the cam angle signal at the advanced-side moving position.

Although depending on the specification of the sensor, the cam angle signal is described as a specification in which the signal level decreases when the detection tooth of a cam plate 111 is detected. The timing at which the ECM detects the cam angle signal is from T321 to T323, and from T321' to T323'. The timing with a dash in the reference sign means that the timing with no dash in the reference sign is the initial position. That is, the timing indicated by the reference sign without a dash is the detection timing of the cam angle signal at the most retarded position, and the timing indicated by the reference sign with a dash is the detection timing of the cam angle signal at the advanced movement position moved in the advanced direction from the most retarded position.

The cam angle signal is also used for cylinder determination, but since the detection timing is changed by the variable valve mechanism, it is necessary to detect the cam angle within a range in which the cam angle signal input information (the number of times and the signal level) does not change. Therefore, the cam angle measurement ranges T311 to T313 (actually continuing in the right direction) are set to the cylinder phase difference interval (compression TDC interval). For example, when the internal combustion engine has three cylinders, the interval is 240 degCA, and when the internal combustion engine has four cylinders, the interval is 180 degCA.

The cam angle is detected by setting the advance ends T301 to T303 (actually continuing in the right direction) of the cam angle measurement ranges T311 to T313 as cam angle measurement reference positions, and setting the angles from the advance ends T301 to T303 to the cam angle signal detection timings T321 to T323 and T321' to T323' as cam angles. For example, in the cam angle measurement range T312, the angle from the cam angle measurement reference position T302 to the detection timing T322 at which the cam angle signal is detected is the cam angle (initial position) 303 of the most retarded position. In the same cam angle measurement range T312, the angle from the cam angle measurement reference position T302 to the detection timing T322' at which the cam angle signal is detected is the cam angle (operation position) 304 at the most advanced movement position. Then, a difference between the cam angle (initial position) 303 and the cam angle (operation position) 304 is calculated as an operation angle (first operation angle) 305. The conventional expression is the following Expression (1).

Operation angle=Cam angle (Initial position)−Cam angle (Operation position)   (1)

In order to control the variable valve mechanism by suitably following the change in the engine speed, it is desirable that the detection frequency of the cam angle is high. A case where the camshaft angle is controlled in the advance direction from the initial angle to the target angle by the variable valve mechanism will be described with reference to FIG. 4 as an example.

Figure 4:
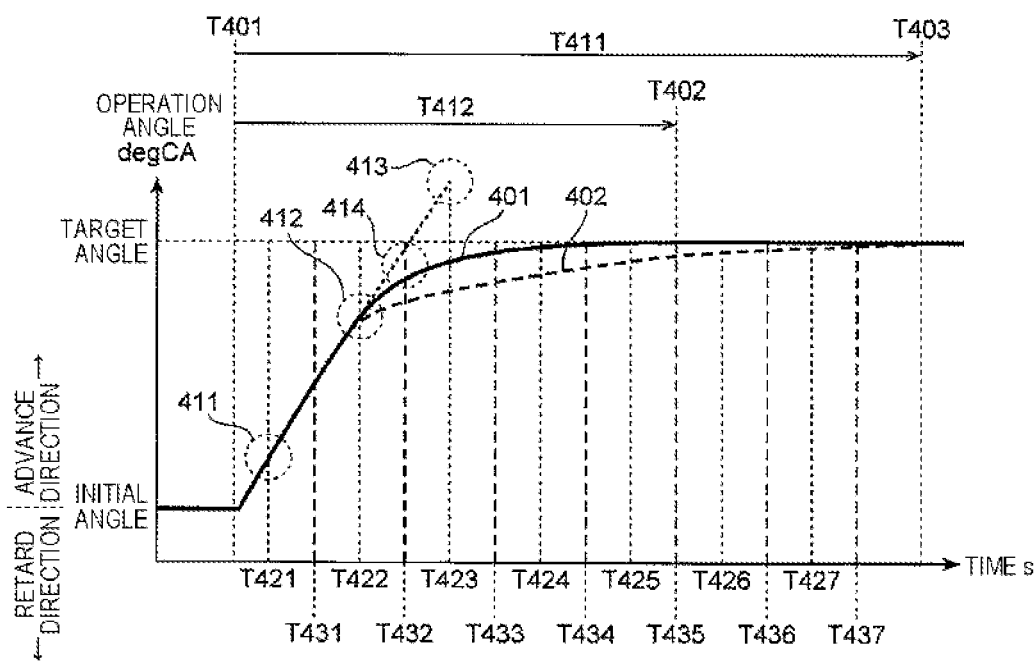
FIG. 4 is a diagram for explaining an effect of improving measurement resolution.

FIG. 4 is a diagram for explaining an effect of improving measurement resolution.

In FIG. 4, an operation when the camshaft angle is controlled based on the detection value of the cam angle detected at a low detection frequency is indicated by a broken line 402, and an operation when the camshaft angle is controlled based on the detection value of the cam angle detected at a high detection frequency is indicated by a solid line 401.

In the low detection frequency control in which the cam operation angle is calculated at the timing of T421 to T427 to control the variable valve mechanism, it is expected that the target angle is exceeded at the next detection timing T423 at the detection timing T422 (413) from the results of the operation angles 411 and 412. Therefore, the angle control amount is reduced to perform the control, and as a result, the timing of reaching the target angle from the start of the control becomes T403, and it takes time from T401 to T403 at T411.

On the other hand, when the detection timing of T431 to T437 is added to the timing of T421 to T427 to improve the time resolution of the operation angle measurement, the operation angle (414) at T432 predicted at T422 does not exceed the target angle. Therefore, it is possible to perform control without reducing the angle control amount, the timing of reaching the target angle from the start of control becomes T402, and the time from T401 to T402 becomes T412 which is shorter than T411, and high-speed target angle control becomes possible.

In order to improve the time resolution of the operation angle measurement, the cam angle signal detection frequency may be improved, and the number of detection teeth installed in the cam angle plate may be increased, and the detection teeth may be arranged at short intervals.

Next, a problem of conventional control when a cam angle plate having a high time resolution in which detection teeth are increased is applied will be described with reference to FIG. 5. FIG. 5 is a diagram for explaining a problem of conventional control.

For example, in order that the cam angle sensor 202 independently detects the cam angle signal for each tooth of the cam angle plate, the cam angle measurement ranges T511 to T515 corresponding to the number of teeth are set. When the cam angle plate having the high time resolution is used, the cam angle measurement range becomes narrower than that when the conventional cam angle plate having a small number of teeth is applied.

However, since the operation range of the variable valve mechanism is determined based on the performance requirement of the internal combustion engine, the same operation range as the conventional operation range can be considered. That is, as in the example in which the cam angle signal T524 is advanced to the position of T524' illustrated in the upper part of FIG. 5, it is conceivable that the cam angle is detected in the adjacent cam angle measurement range T512 beyond the cam angle measurement range T513.

In this case, although the camshaft actually operates by the operation angle 503 in the advance direction, in the cam angle measurement range T513 in which T503 is set as the cam angle measurement reference position, the operation angle 504 (retarded value) is calculated by comparing the cam angles T524 and T525' (erroneous calculation). As illustrated in the lower part of FIG. 5, although the actual cam angle gradually increases in the advance direction as indicated by a dotted line 533, in the conventional calculation method, the operation angle 534 after exceeding the cam angle measurement reference position angle 532 (after T534) is calculated as the retard value.

When this value is fed back, the advance is excessively controlled toward the target angle 531, so that the operation range of the variable valve mechanism is limited and narrowed within the cam angle measurement range so as not to exceed the measurement reference position 532.

Next, a method for realizing the high time resolution measurement without narrowing the operation range of the variable valve mechanism will be described with reference to FIG. 6. FIG. 6 is a diagram for explaining a method for solving a conventional problem.

For example, when the camshaft is advanced from the most retarded position by the operation of the variable valve mechanism and moves from the cam angle signal T624 to the cam angle signal T624' as illustrated in the upper and lower parts of FIG. 6, the operation angle 603 of the cam angle signal detected at the position exceeding the cam angle measurement range T613 is configured by the cam angle (initial position) 601 and the angle 604 from the cam angle measurement reference position T603 to T624'.

The angle 604 is obtained from the angle between the cam angle 602 of the cam angle signal T624' and the cam angle measurement range T612 in the cam angle measurement range T612 which is another cam angle measurement range adjacent to the cam angle measurement range T613 on the advance side. That is, a value obtained by subtracting the cam angle 602 from the angle of the cam angle measurement range T612 is the angle 604. This angle is defined as a conversion angle of the cam angle 602 and a conversion cam angle 604. The conversion cam angle 604 is an angle obtained by converting an operation cam angle in another cam angle measurement range at the operation position of the variable valve into an advance direction value.

Therefore, an accurate operation angle (second operation angle) 603 in the advance direction is obtained by adding the cam angle (initial position) 601 and the conversion cam angle 604. The conversion cam angle use expression is the following Expression (2).

$$\text{Operation angle(when exceeded)} = \text{Cam angle(Initial position)} + \text{Conversion cam angle(Operation position)} \quad (2)$$

In the lower part of FIG. 6, the calculation result of the measurement angle when the target angle 631 is set in the region exceeding a cam angle measurement reference position angle 632 and the control is started is illustrated. The conventional Expression (1) is used to convert the cam angle detected before exceeding the cam angle measurement reference position angle 632 into the operation angle. When the cam angle detected exceeding the cam angle measurement reference position angle 632 is converted into the operation angle, that is, the expression for obtaining the operation angle after T634 is switched from the conventional Expression (1) described in FIG. 3 to the conversion cam angle use Expression (2) described in the upper part of FIG. 6, so that an operation angle 634 along a camshaft operation 633 can be calculated without erroneously calculating the retard value. Therefore, even in a region where the cam angle exceeds the cam angle measurement reference position angle, angle measurement with high time resolution can be realized.

By appropriately changing the expression for obtaining the operation angle in this manner, the operation angle of the cam can be correctly calculated even in a region where the cam angle exceeds the cam angle measurement reference position.

Next, a method for determining the switching of expressions of the operation angle will be described.

Figure 7:
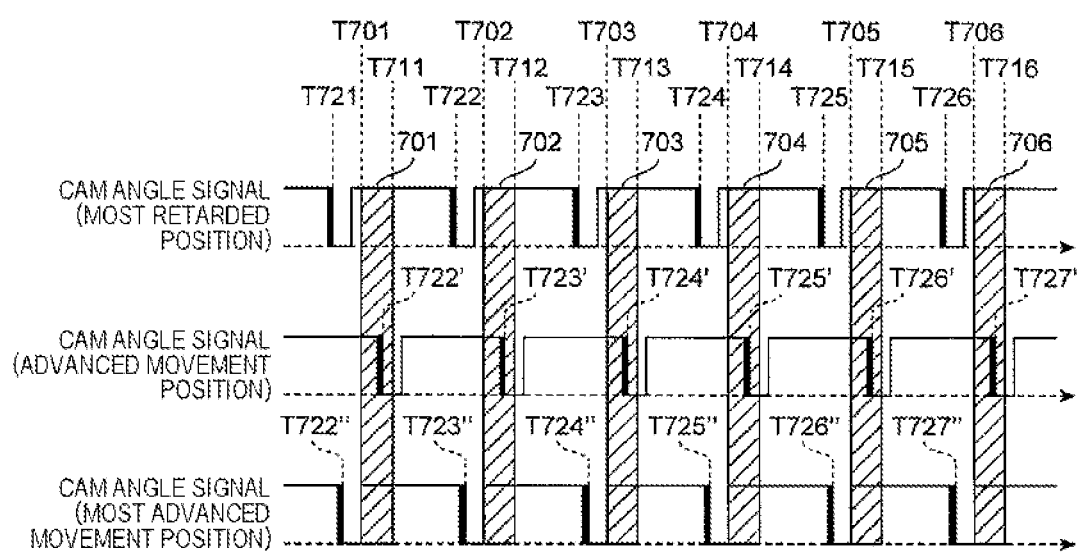
FIG. 7 is a diagram for explaining features of a measurement method in an embodiment of a control device of the present invention.

The switching of the operation angle expressions can be performed by identifying that the cam angle signal exceeds the cam angle measurement reference position. However, it is necessary to distinguish whether the cam angle signal detected in the region beyond the cam angle measurement reference position is the detection signal by the advance or the detection signal by the retard. For example, the cam angle signal T725" illustrated in FIG. 7 needs to be distinguished whether it is an advanced signal of T725 or a retarded signal of T724. Therefore, as in a section 704 from T704 to T714, a predetermined range in the retard direction from the cam angle measurement reference position is defined as a cam angle signal determination range (701 to 706). When the cam angular changes in the advance direction to exceed the cam angle measurement reference position and move to another adjacent cam angle measurement range, whether the cam angle exceeds the cam angle measurement reference position is determined by using the fact that the cam angle always passes through the cam angle signal determination range.

That is, it is determined that the signal detected in the region exceeding the cam angle measurement reference position after being detected in the cam angle signal determination range is based on the advance, and the operation angle is calculated using the conversion cam angle use Expression (2) described in FIG. 6.

The cam angle signal determination range is set to either an angle or a time. In the present embodiment, it is assumed that the angle is set. Next, how to determine the width of the cam angle signal determination range will be described.

The cam angle signal determination range should be a range in which the advancing cam angle signal can be reliably detected at least once or more. That is, if the width of the cam angle signal determination range is synchronized with the input speed of the cam angle signal, one cam angle signal can be reliably detected. Since the input speed of the cam angle signal changes depending on the operation speed of the variable valve mechanism and the engine speed, a width corresponding to each parameter will be described with reference to FIG. 8.

FIG. 8 is a diagram for explaining a method for setting the width of the cam angle signal determination range.

The upper part of FIG. 8 illustrates operation examples when the operation speed of the variable valve mechanism is fast 801 and when the operation speed is slow 802 when the engine speed is high. The input cycle of the cam angle signal is represented by sections T811 to T815. The input cycle is generally determined by the engine speed, and the angular change is determined by the operation speed of the variable valve mechanism. When the angular change is large, the cam passes through a measurement reference position 805 at a high speed, and thus the width of the cam angle signal determination range needs to be wide in order to reliably capture the cam angle signal one or more times.

When the variable valve mechanism operates at a relatively low operation speed 802, if the width of the cam angle signal determination range is set to 808, the cam angle detection 811 in the cam angle signal determination range 808 can be performed at T804.

On the other hand, even if the same width 808 is applied to the case 801 where the variable valve mechanism operates at a relatively high operation speed, the cam angle cannot be detected at the timing of T801. Therefore, by widening the width of the cam angle signal determination range from 808 to 809, the cam angle detection 810 can be performed at T801.

Next, the lower part of FIG. 8 illustrates operation examples when the operation speed of the variable valve mechanism is fast 801 and when the operation speed is slow 802 when the engine speed is low. The input cycle of the cam angle signal is represented by sections T821 to T824.

Even if the cam angle signal determination range width 808 when the engine speed is high is applied in the case 802 where the variable valve mechanism operates at a relatively low operation speed, the cam angle 813 is out of the width 808 of the cam angle signal determination range at the timing of T822, and cannot be detected. Therefore, by widening the width of the cam angle signal determination range from 808 to 808', the cam angle can be detected at T822. In the present embodiment, the width 808 of the cam angle signal determination range is widened to the side where the operation angle degCA decreases to be the width 809.

The same applies to 801 operating at a relatively high operation speed, for example, as illustrated in the lower part of FIG. 8, by widening the width from 809 to 809', the cam angle 812 can be detected at T821.

From the relationship between the operation speed of the variable valve mechanism and the cam angle signal input cycle described above, the width of the cam angle signal determination range may be obtained by the product of the operation speed of the variable valve mechanism and the cam angle signal input cycle. The cam angle signal input cycle is synchronized with the engine speed, and the width of the cam angle signal determination range may be calculated using the engine speed as a calculation parameter instead of the cam angle signal input cycle.

Figure 9:
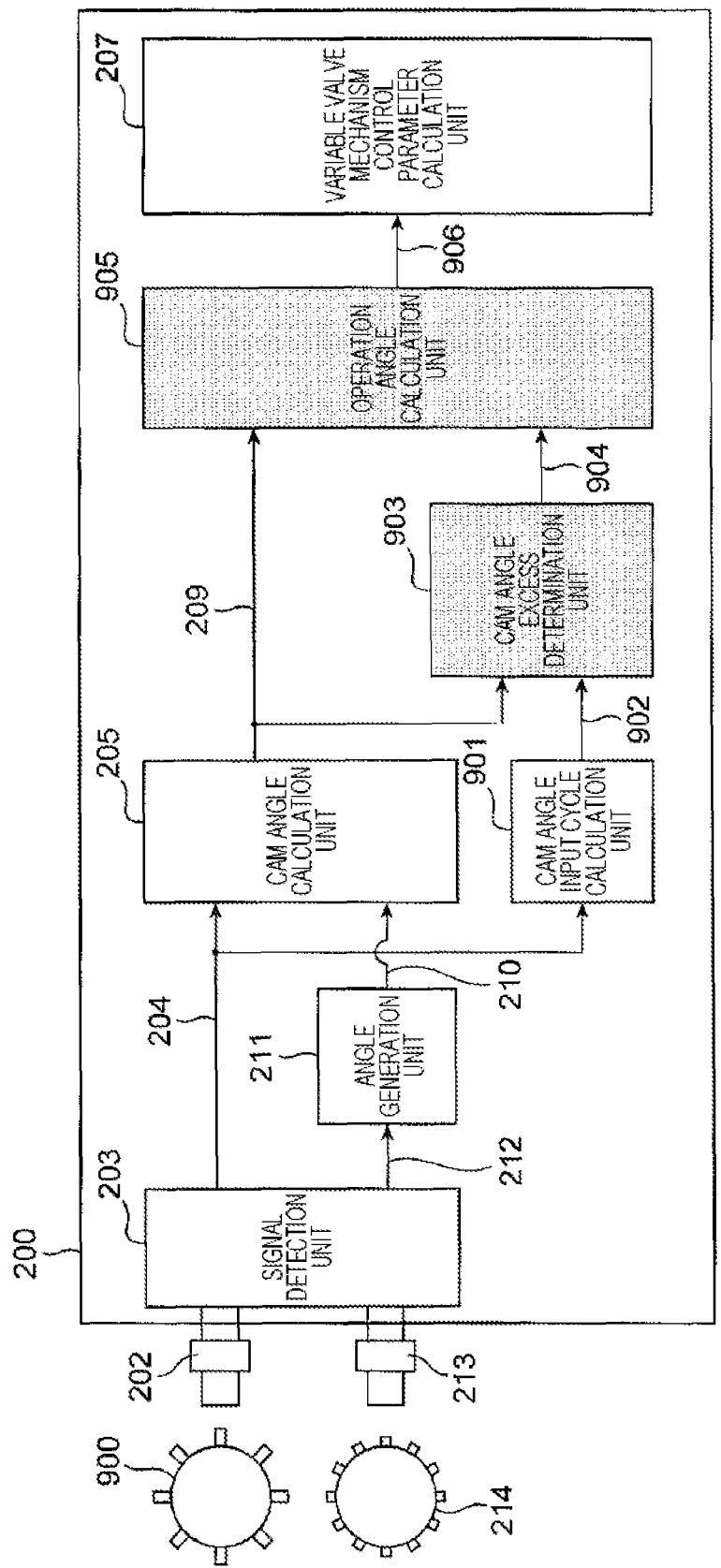
FIG. 9 is a block diagram for explaining a configuration of internal functions of a control device according to a first embodiment.

A functional configuration of the present invention will be described with reference to FIG. 9 with respect to a conventional functional configuration. FIG. 9 is a block diagram for explaining a configuration of an internal function of the control device according to the first embodiment. In the control device of the present embodiment, a cam angle excess determination unit 903 that determines that the cam angle signal is detected to have moved in the advance direction from the most retarded position and to have exceeded the cam angle measurement reference position is newly added.

An operation angle calculation unit 905 has been changed to a configuration in which the expression is changed with reference to the determination result 904 of the cam angle excess determination unit 903. The calculation result 906 of the operation angle calculation unit 905 is output to the variable valve mechanism control parameter calculation unit 207 as in the related art.

Although a cam angle input cycle calculation unit 901 is not included in the configuration illustrated in FIG. 2, since the input cycle calculation function is a known technology used for cylinder discrimination or the like, a function used other than the cam angle measurement may be used or may be added to this configuration.

Figure 10:
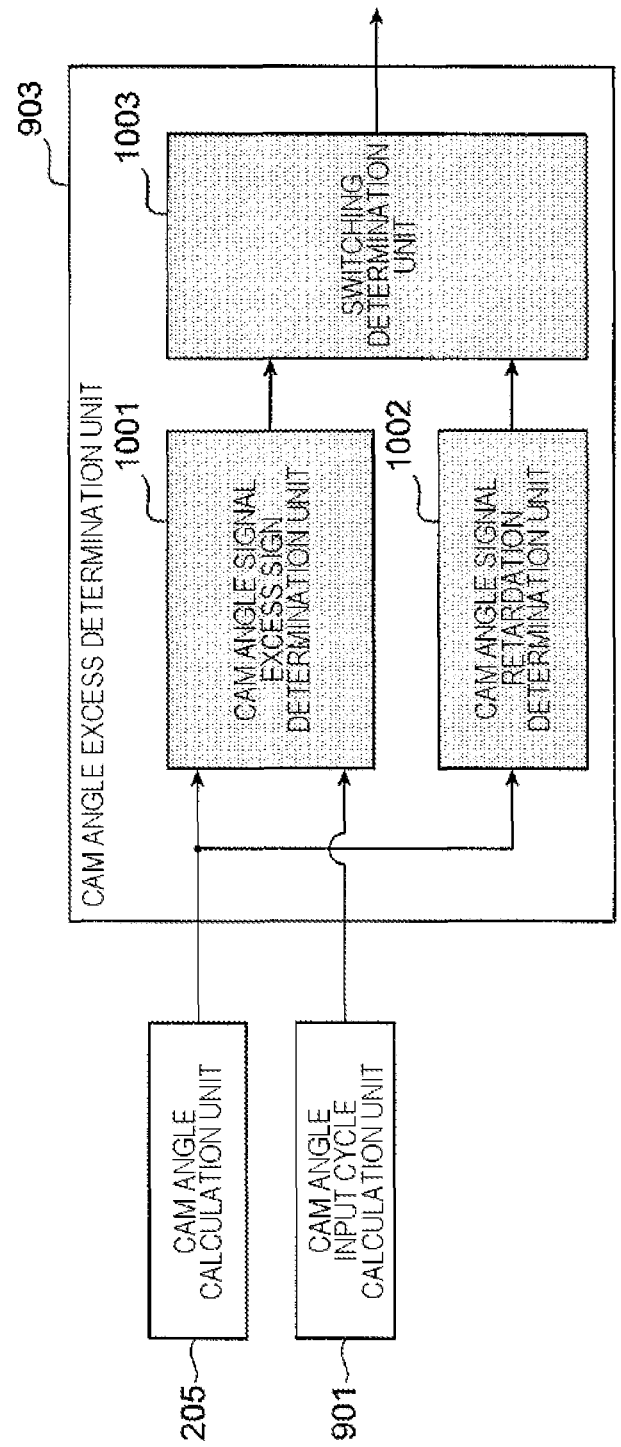
FIG. 10 is a block diagram for explaining a configuration of an internal function of a cam angle excess determination unit.

Next, a functional configuration of the cam angle excess determination unit 903 will be described with reference to FIG. 10. The cam angle excess determination unit 903 includes a cam angle signal excess sign determination unit 1001 that determines that the cam angle signal is detected in the cam angle signal determination range by the advance of the cam angle, a cam angle signal retard determination unit 1002 that determines that the cam angle signal is detected on the retard side from the initial position in the cam angle measurement range, and a switching determination unit 1003 that instructs switching of the expressions used in the operation angle calculation unit 905.

Figure 11:
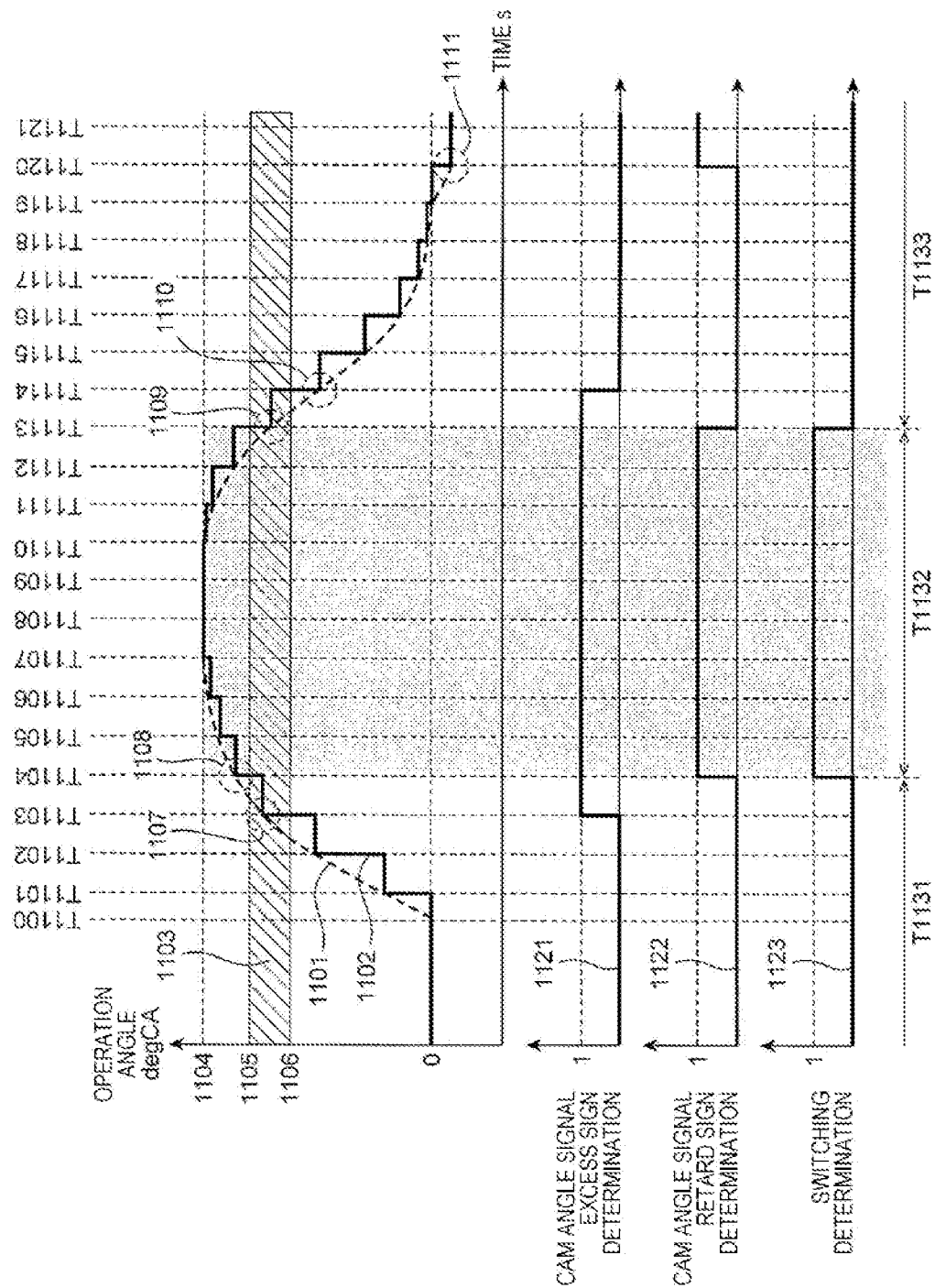
FIG. 11 is a graph illustrating a change in output of a cam angle excess determination unit according to an operation angle.

Next, each function of the cam angle excess determination unit will be described with reference to a timing chart of FIG. 11.

As an example, the operation of the camshaft assuming a case where the camshaft is advanced to a target operation angle 1104 exceeding a measurement reference position angle 1105, then returned to the initial position angle θ degCA, and temporarily operated in the retard direction due to the design margin of the camshaft operation range or the relationship of the camshaft rotational force is indicated as 1101. The operation of the variable valve mechanism is started from T1100, and the cam angle signal is detected at the timing of T1101 to T1121. The operation angle calculation result is represented as 1102.

The cam angle signal excess sign determination unit 1001 sets the cam angle signal excess sign determination value to 1 at T1103 when the cam angle signal is detected in the cam angle signal determination range 1103. The previous value is held while the cam angle is advanced beyond the measurement reference position angle 1105. When shifting from the target operation angle 1104 to the initial position, the cam angle signal excess sign determination value is set to 1 at T1113 when the cam angle is detected in the cam angle signal determination range 1103. Since the cam angle signal is detected on the retard side of the cam angle signal determination range 1103 at T1114, the cam angle signal excess sign determination value is set to 0.

The cam angle signal retard determination unit 1002 sets the cam angle signal retard determination value to 1 when the cam angle calculation unit 205 calculates a value on the retard side from the initial position regardless of the operation direction of the camshaft. Therefore, T1104 to T1113, T1120, and T1121 are 1. When the cam angle calculation unit 205 calculates a value on the advance side from the initial position, the cam angle signal retard determination value is set to 0.

When the cam angle signal excess sign determination value 1121 is 1 and the cam angle signal retard determination value 1122 is 1, the switching determination unit 1003 determines that the cam angle exceeds the measurement reference position angle 1105 and sets the switching determination value to 1 for switching the operation angle expression. Therefore, in a section T1132 from T1104 to T1113, the switching determination value is set to 1. Since the condition is not satisfied in the other sections T1131 and T1133, the switching determination value is set to 0.

Figure 12:
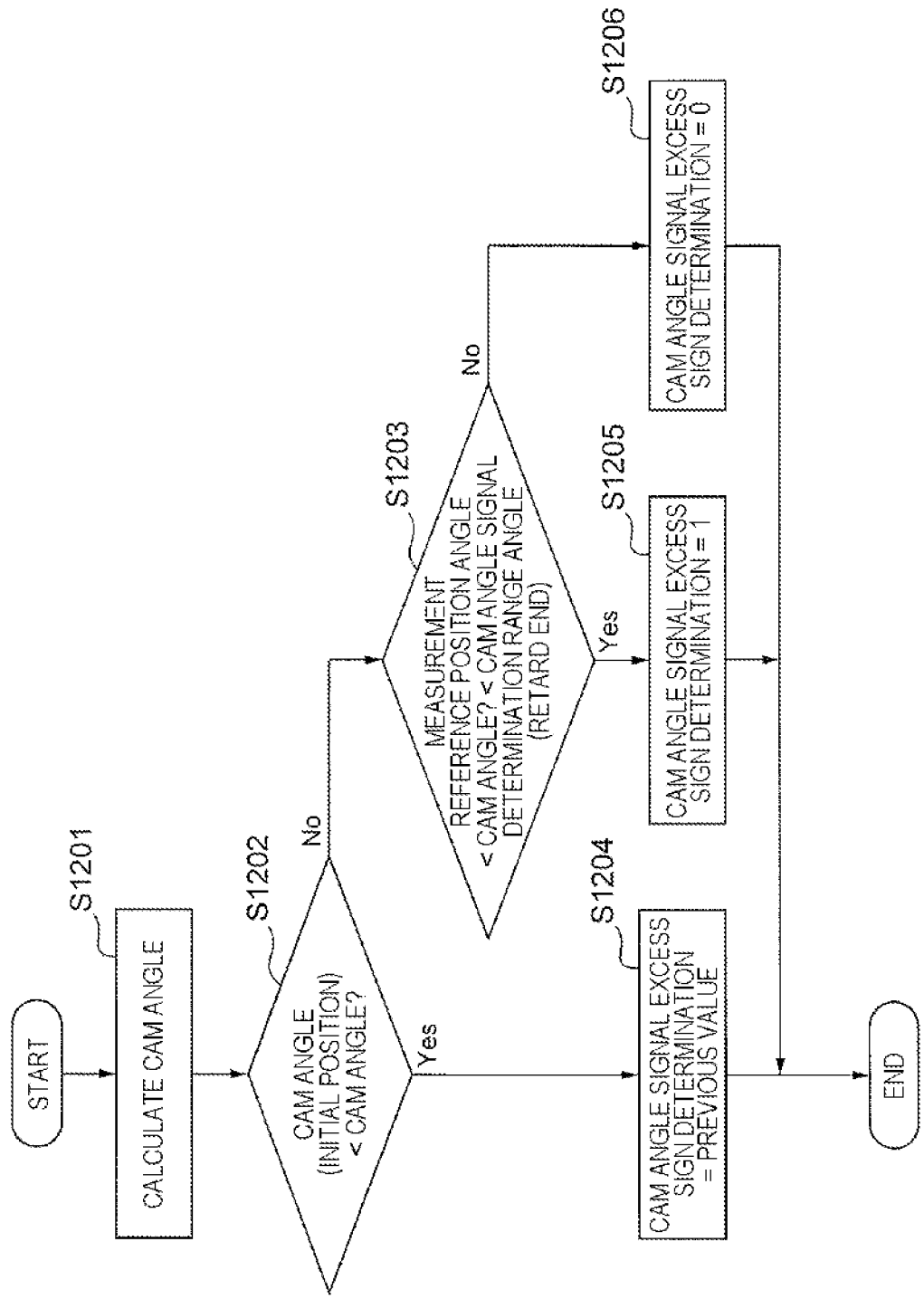
FIG. 12 is a flowchart illustrating processing contents of a cam angle signal excess sign determination unit.

Next, a control flowchart of the cam angle signal excess sign determination unit 1101 will be described with reference to FIG. 12. FIG. 12 is a flowchart illustrating processing contents of the cam angle signal excess sign determination unit.

It is necessary to set a value when the cam angle is detected in the cam angle signal determination range to 1, and to maintain 1 when the cam angle is further advanced thereafter. On the other hand, when detection is simply retarded from the initial position, it is necessary to maintain 0. That is, when the cam angle is detected on the retard side of the initial position, the previous value may be maintained.

Therefore, whether the cam angle calculated in S1201 is larger than the cam angle calculated at the initial position is determined in S1202. When the value is large, the process proceeds to S1204, and the cam angle signal excess sign determination value is not changed from the previous value.

On the other hand, when the cam angle calculated in S1201 is equal to or smaller than the cam angle calculated at the initial position, it is determined in S1203 whether the cam angle is within the cam angle signal determination range, that is, whether the cam angle is smaller than the retard end of the cam angle signal determination range angle and larger than the cam angle measurement reference position angle. The cam angle signal excess sign determination value is set to 1 in the case of an angle falling within the cam angle signal determination range (YES in S1203), and is set to 0 in the case of an angle not falling within the cam angle signal determination range (NO in S1203).

(Modifications)

Figure 13:
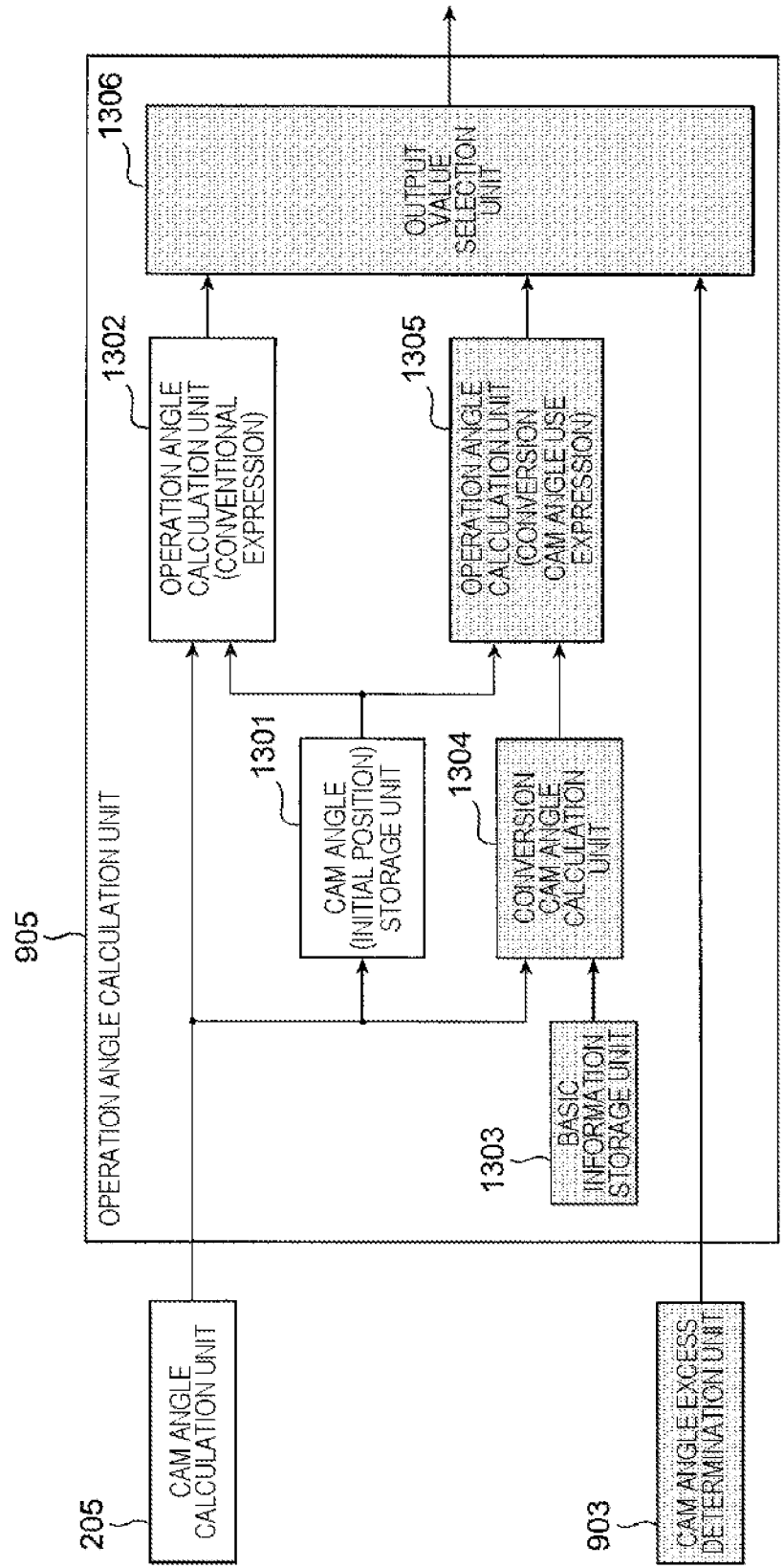
FIG. 13 is a block diagram for explaining a configuration of an internal function of an operation angle calculation unit in a second embodiment.

Next, a modification of the functional configuration of the operation angle calculation unit will be described with reference to FIG. 13.

Conventionally, regarding the calculation result of the cam angle calculation unit 205, the initial calculation value after engine start is stored in a cam angle (initial position) storage unit 1301. However, since the cam angle at the initial position can be determined in advance by the mounting positional relationship between cam plates 201 to 900 and a crank plate 214, the stored value of the cam angle (initial position) storage unit 1301 may be a fixed value.

Further, an operation angle calculation unit (conventional expression) 1302 calculates the operation angle by the conventional Expression (1) described in FIG. 3 from the relationship between the cam angle calculation result and the initial position cam angle.

In the present invention, in addition to the conventional configuration, a basic information storage unit 1303, a conversion cam angle calculation unit 1304, an operation angle calculation unit (conversion cam angle use expression) 1305, and an output value selection unit 1306 are newly added.

The angle of the cam angle measurement range as indicated by T611 in FIG. 6 is stored in advance in the basic information storage unit 1303. The conversion cam angle calculation unit 1304 calculates the conversion cam angle using the angle of the cam angle measurement range and the cam angle calculation result as described with reference to FIG. 6. As described with reference to FIG. 6, the operation angle calculation unit (conversion cam angle use expression) 1305 calculates the operation angle by adding the initial position cam angle and the conversion cam angle using the conversion cam angle use Expression (2).

The output value selection unit 1306 outputs the calculation result of the operation angle calculation unit (conventional expression) 1302 when the switching determination result calculated by the cam angle excess determination unit 903 is 0, and outputs the calculation result of the operation angle calculation unit (conversion cam angle use expression) 1305 when the switching determination result is 1.

Figure 14:
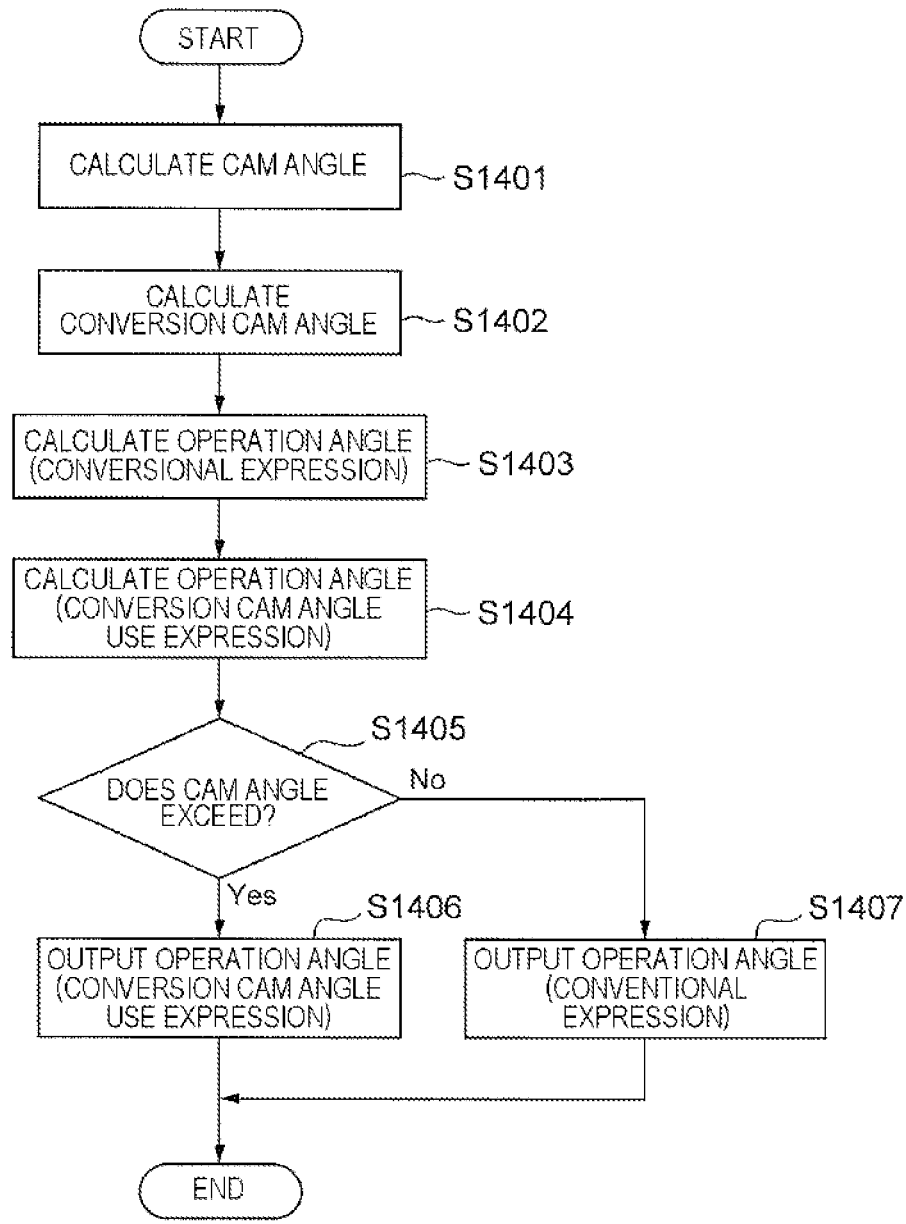
FIG. 14 is a flowchart illustrating processing contents of an operation angle calculation unit.

The operation angle calculation flow will be described with reference to FIG. 14.

From the cam angle calculated in S1401, the conversion cam angle is calculated in S1402.

Next, from the cam angle calculated in S1401, the operation angle according to the conventional Expression (1) is calculated in S1403.

Next, the operation angle is calculated in S1404 from the conversion cam angle calculated in S1402 by the conversion cam angle use Expression (2).

Finally, based on the cam angle excess determination result, when the cam angle exceeds the measurement reference position angle, the calculation result of S1404 is output as the operation angle. When the cam angle does not exceed the measurement reference position angle, the calculation result of S1403 is output as the operation angle.

Second Embodiment

An embodiment of a cam angle measuring method according to a second embodiment of the present invention will be described with reference to the drawings.

Since the configuration of the internal combustion engine including the variable valve mechanism and the configuration of the control function related to the operation angle calculation of the related art are the same as those in the first embodiment using FIGS. 1 and 2, the description thereof will be omitted.

In the present second embodiment, a configuration in which the initial position is placed between the most retarded position and the most advanced position and controlled in both the advance direction and the retard direction will be described as an example, but the present invention is not limited to this configuration.

Calculation contents of the cam angle calculation unit 205 and the operation angle calculation unit 206 in FIG. 2 will be specifically described with reference to FIG. 15.

Figure 15:
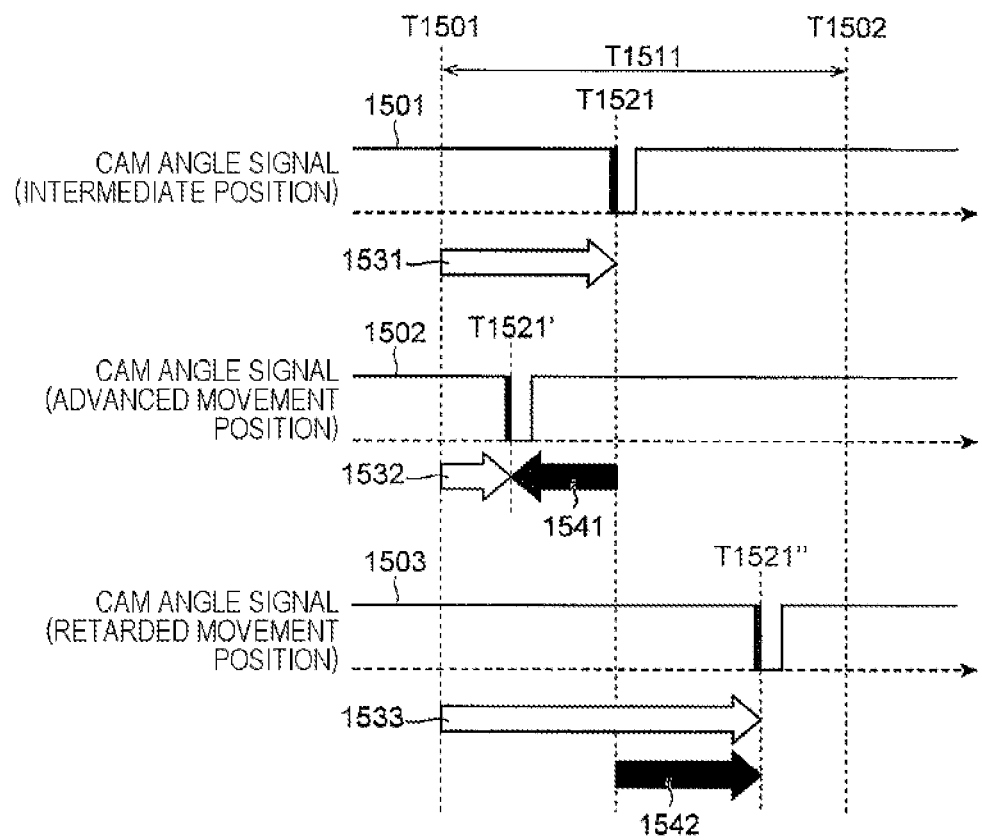
FIG. 15 is a diagram for explaining a conventional operation angle measuring method.

FIG. 15 is a diagram for explaining a conventional operation angle measuring method, in which a horizontal axis represents time and a vertical axis represents a cam angle signal. The upper part of FIG. 15 illustrates a detection example 1501 of the cam angle signal at the intermediate position, and the lower part of FIG. 15 illustrates a detection example 1502 of the cam angle signal at the advanced-side moving position and a detection example 1503 of the cam angle signal at the retarded-side moving position.

Although depending on the specification of the sensor, the cam angle signal is described as a specification in which the signal level decreases when the detection tooth of the cam plate 111 is detected. The timing at which the ECM detects the cam angle signal is T1521, and T1521', T1521". The timing with a dash in the reference sign means that the timing with no dash in the reference sign is the initial position. That is, the timing indicated by the reference sign without a dash is the detection timing of the cam angle signal at the intermediate position, and the timing indicated by the reference sign with a dash is the detection timing of the cam angle signal at the advanced movement position moved in the advance direction from the intermediate position or the cam angle signal at the retarded movement position moved in the retard direction from the intermediate position.

The cam angle signal is also used for cylinder determination, but since the detection timing is changed by the variable valve mechanism, it is necessary to detect the cam angle within a range in which the cam angle signal input information (the number of times and the signal level) does not change. Therefore, the cam angle measurement ranges T1511 (actually continuing in the right direction) are set to the cylinder phase difference interval (compression TDC interval). For example, when the internal combustion engine has three cylinders, the interval is 240 degCA, and when the internal combustion engine has four cylinders, the interval is 180 degCA.

The cam angle is detected such that an advance end T1501 (actually continued rightward) of the cam angle measurement range T1511 is set as a cam angle measurement reference position, and an angle from the advance end T1501 to the cam angle signal detection timings T1521, T1521', and T1521" is set as a cam angle. For example, in the cam angle measurement range T1511, the angle from the cam angle measurement reference position T1501 to the detection timing T321 at which the cam angle signal is detected is the cam angle (initial position) 1531 at the intermediate position.

In the same cam angle measurement range T1511, the angle from the cam angle measurement reference position T1501 to the detection timing T1521' at which the cam angle signal is detected becomes the cam angle (operation position) 1532 at the advanced movement position. Then, a difference between the cam angle (initial position) 1531 and the cam angle (operation position) 1532 is calculated as the operation angle (first operation angle) 1541. The conventional expression is the following Expression (1).

Operation angle=Cam angle(Initial position)−Cam angle(Operation position)  (1)

In the same cam angle measurement range T1511, the angle from the cam angle measurement reference position T1501 to the detection timing T1521" at which the cam angle signal is detected is the cam angle (operation position) 1533 at the retarded movement position. Then, a difference between the cam angle (initial position) 1531 and the cam angle (operation position) 1533 is calculated as the operation angle (first operation angle) 1542. This conventional expression is the above Expression (1).

In the present embodiment, the operation angle at the advanced movement position has a positive value, and the operation angle at the retarded movement position has a negative value.

Next, a problem of conventional control when a cam angle plate having a high time resolution in which detection teeth are increased is applied will be described with reference to FIG. 16. FIG. 16 is a diagram for explaining a problem of conventional control.

For example, in order that the cam angle sensor 202 independently detects the cam angle signal for each tooth of the cam angle plate, the cam angle measurement range T1601 corresponding to the number of teeth are set. When the cam angle plate having the high time resolution is used, the cam angle measurement range becomes narrower than that when the conventional cam angle plate having a small number of teeth is applied.

However, since the operation range of the variable valve mechanism is determined based on the performance requirement of the internal combustion engine, the same operation range as the conventional operation range can be considered. That is, as in the example in which the cam angle signal T1621 is advanced to the position of T1621' or the example in which the cam angle signal T1621 is retarded to the position of 11621" illustrated in the upper part of FIG. 16, the cam angle may be detected in the adjacent cam angle measurement range T1610 or T1612 beyond the cam angle measurement range T1611.

In the example in which the cam angle signal T1621 is retarded to the position of 11621", the camshaft actually operates by the operation angle 1651 in the retard direction, but in the cam angle measurement range T1611 in which T1601 is set as the cam angle measurement reference position, the operation angle 1651' (advanced value) is calculated by comparing the cam angles of T1621 and 11620" (erroneous calculation). As illustrated in the lower part of FIG. 16, although the actual cam angle changes so as to gradually increase in the retard direction in the section from T1641 to T1647 as indicated by a dotted line 1665, in the conventional calculation method, the operation angle 1666 after exceeding the cam angle measurement reference position angle 1663 (after T1645) is calculated as the advance value.

When this value is fed back, the advance is excessively controlled toward the target angle 1664, so that the operation range of the variable valve mechanism is limited and narrowed within the cam angle measurement range so as not to exceed the measurement reference position 1663.

Assuming that the cam angle signal 11620" and the cam angle signal 11621" are signals that are arranged at equal intervals and move in parallel in the circumferential direction of the camshaft, it can be said that the cam angle of the cam angle signal 11620" is equal to the cam angle of the cam angle signal 11621". The angle of the cam angle measurement range T1611 is a value determined in advance at the time of design, and the operation angle 1666 can be obtained from the cam angle of the cam angle signal 11620" and the cam angle signal T1621 and the angle of the cam angle measurement range T1611.

Therefore, if the cam angle signal T1620" is a signal that places the initial position in the adjacent cam angle measurement range T1610, and it can be determined that the initial position has moved in the retard direction beyond the cam angle measurement reference position T1601, the operation angle calculation method can be switched.

Figure 17:
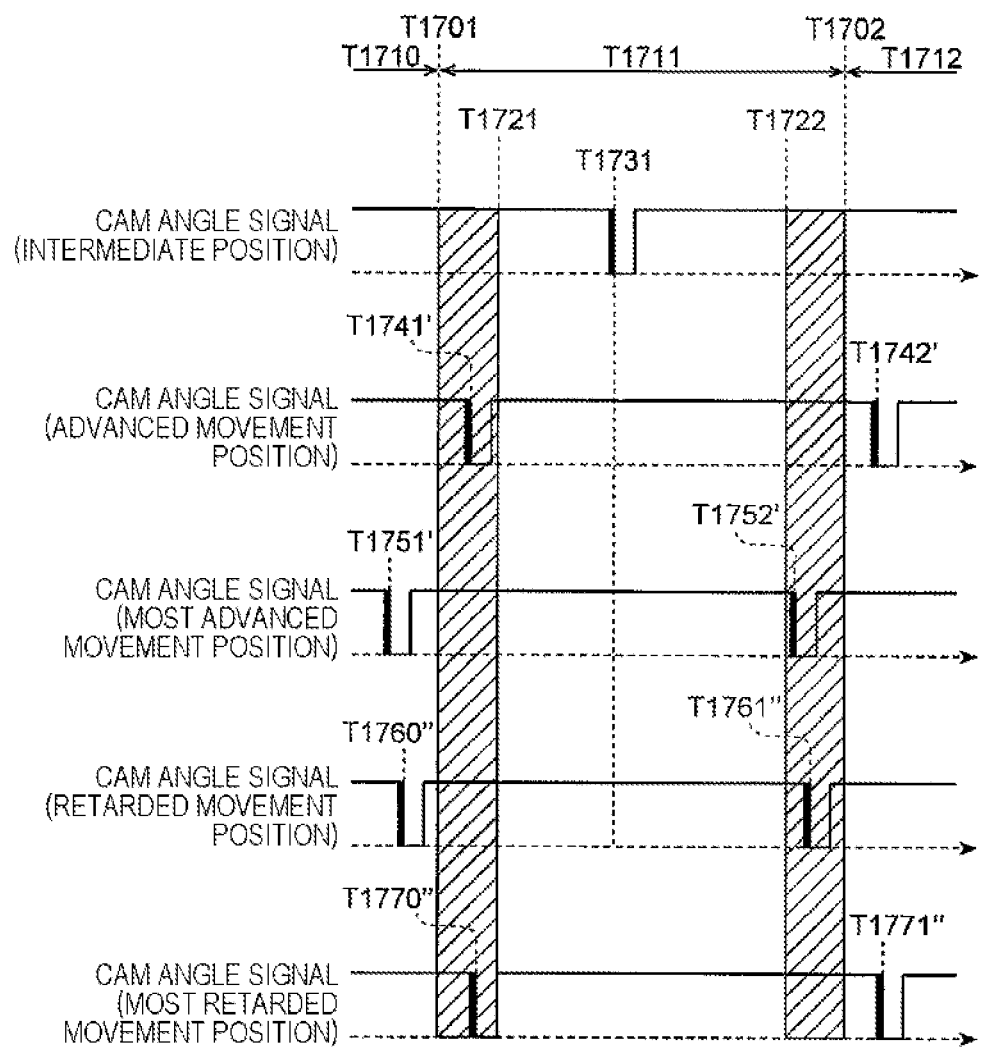
FIG. 17 is a diagram for explaining features of a measurement method in an embodiment of the control device of the present invention.

Next, the method for determining the switching of expressions of the operation angle will be described with reference to FIG. 17. FIG. 17 is a diagram for explaining a range in which it is determined that there is a sign that the cam angle signal exceeds the cam angle measurement reference position.

The switching of the operation angle expressions can be performed by identifying that the cam angle signal exceeds the cam angle measurement reference position. However, it is necessary to distinguish whether the cam angle signal detected in the region exceeding the cam angle measurement reference position is a detection signal due to advancement or retardation in the cam angle measurement range without exceeding the cam angle measurement reference position. For example, the cam angle signal T1771" illustrated in FIG. 17 needs to be distinguished whether the signal is a retarded signal of T1731 or a signal in which the cam angle signal whose initial position is located in the adjacent cam angle measurement range T1712 is an advanced signal. Therefore, as in a section 1702 from T1722 to T1702, a predetermined range in the advance direction from the cam angle measurement reference position is defined as a cam angle signal retard determination range (1701). When the cam angular changes in the retard direction to exceed the cam angle measurement reference position and move to another adjacent cam angle measurement range, whether the cam angle exceeds the cam angle measurement reference position is determined by using the fact that the cam angle always passes through the cam angle signal retard determination range.

When the cam angular changes in the advance direction to exceed the cam angle measurement reference position and move to another adjacent cam angle measurement range, whether the cam angle exceeds the cam angle measurement reference position is determined by using the fact that the cam angle always passes through a cam angle signal advance determination range. The definition of the cam angle signal advance determination range is the same as the definition of the cam angle signal retard determination range, and is the same as the content described in the description of FIG. 7 in the first embodiment.

That is, it is determined that the signal detected in the region exceeding the cam angle measurement reference position after being detected in the cam angle signal retard determination range is caused by the retard, it is determined that the signal detected in the region exceeding the cam angle measurement reference position after being detected in the cam angle signal advance determination range is caused by the advance, and the expression is switched from the conventional expression to calculate the switching operation angle.

The cam angle signal determination range is set to either an angle or a time. In the present embodiment, it is assumed that the angle is set. How to determine the width of the cam angle signal determination range is determined based on the same concept as that described in FIG. 8 in the first embodiment, and thus the description thereof is omitted.

Next, a method for realizing the high time resolution measurement without narrowing the operation range of the variable valve mechanism will be described with reference to FIG. 18. FIG. 18 is a diagram for explaining a method for calculating an operation angle by a signal detected in a region exceeding a cam angle measurement reference position.

For example, when the camshaft is retarded from the intermediate position by the operation of the variable valve mechanism and moved from the cam angle signal T1821 to the cam angle signal T1821" as illustrated in the upper and lower parts of FIG. 18, the operation angle 1851 of the cam angle signal detected at the position exceeding the cam angle measurement range T1811 is configured by the cam angle (initial position) 1831 and the angle 1833" from the cam angle measurement reference position T1801 to 11821".

The angle 1833" is obtained from the cam angle of the cam angle signal 11811" and the angle of the cam angle measurement range T1812 in the cam angle measurement range T1821 which is another cam angle measurement range adjacent to the cam angle measurement range T1811 on the retard side. Assuming that the cam angle signal 11820" and the cam angle signal 11821" are signals that are arranged at equal intervals and move in parallel in the circumferential direction of the camshaft, it can be said that the cam angle of the cam angle signal T1820" is equal to the cam angle of the cam angle signal T1821". Therefore, the cam angle of the cam angle signal T1821" is 1833. That is, a value obtained by adding the angle of the cam angle measurement range T1811 and the cam angle 1833 is the angle 1833". This angle is defined as a conversion angle of the cam angle 1833 and the conversion cam angle 1833".

Therefore, by subtracting the conversion cam angle 1833" from the cam angle (initial position) 1831, an accurate operation angle (third operation angle) 1851 in the retard direction is obtained. The conversion cam angle use expression is the following Expression (3).

Operation angle(when retarding direction is exceeded)=Cam angle(Initial position)−Conversion cam angle(Operation position) (3)

The expression in the case of exceeding in the advance direction is the same as Expression (2) described in FIG. 6, and thus the description thereof is omitted here.

The lower part of FIG. 18 illustrates a calculation result of the measurement angle when the target angles 1861 and 1864 are set in the regions exceeding the cam angle measurement reference position angles 1862 and 1863 and the control is started. The vertical axis represents the operation angle calculation result, and the 0 position indicates the cam initial position. The cam angle measurement reference position angle 1862 corresponds to the cam angle measurement reference position T1801 of the cam angle measurement range T1811 in the upper part of FIG. 18, and the cam angle measurement reference position angle 1863 corresponds to the cam angle measurement range T1812 in the upper part of FIG. 18.

The conventional Expression (1) is used to convert the cam angle detected before exceeding the cam angle measurement reference position angles 1862 and 1863 into the operation angle. When the cam angle detected exceeding the cam angle measurement reference position angles 1862 and 1863 is converted into the operation angle, the operation angle 1866 along the camshaft operation 1865 can be calculated without erroneous calculation by switching the expression for obtaining the operation angle in the sections T1833 to T1837 from the conventional Expression (1) described in FIG. 3 to the conversion cam angle use Expression (2) described in the upper part of FIG. 6, and switching the Expression for obtaining the operation angle in the sections T1845 to T1850 from the conventional Expression (1) described in FIG. 3 to the conversion cam angle use Expression (3) described in the upper part of FIG. 18. Therefore, even in a region where the cam angle exceeds the cam angle measurement reference position angle, angle measurement with high time resolution can be realized.

By appropriately changing the expression for obtaining the operation angle in this manner, the operation angle of the cam can be correctly calculated even in a region where the cam angle exceeds the cam angle measurement reference position. Since the functional configuration of the present invention with respect to the conventional functional configuration is the same as that in FIG. 9, the description thereof is omitted.

Next, a functional configuration of the cam angle excess determination unit will be described.

The cam angle excess determination unit includes a cam angle signal advance excess sign determination unit that determines that the cam angle signal is detected in the cam angle signal advance determination range by the advance of the cam angle, a cam angle signal retard determination unit that determines that the cam angle signal is detected on the retard side from the initial position in the cam angle measurement range, a switching determination unit A that instructs switching to Expression (2) used in the operation angle calculation unit, a cam angle signal retard excess sign determination unit that determines that the cam angle signal is detected in the cam angle signal retard determination range by the retard of the cam angle, a cam angle signal advance determination unit that determines that the cam angle signal is detected on the advance side from the initial position in the cam angle measurement range, and a switching determination unit B that instructs switching to Expression (3) used in the operation angle calculation unit.

Figure 19:
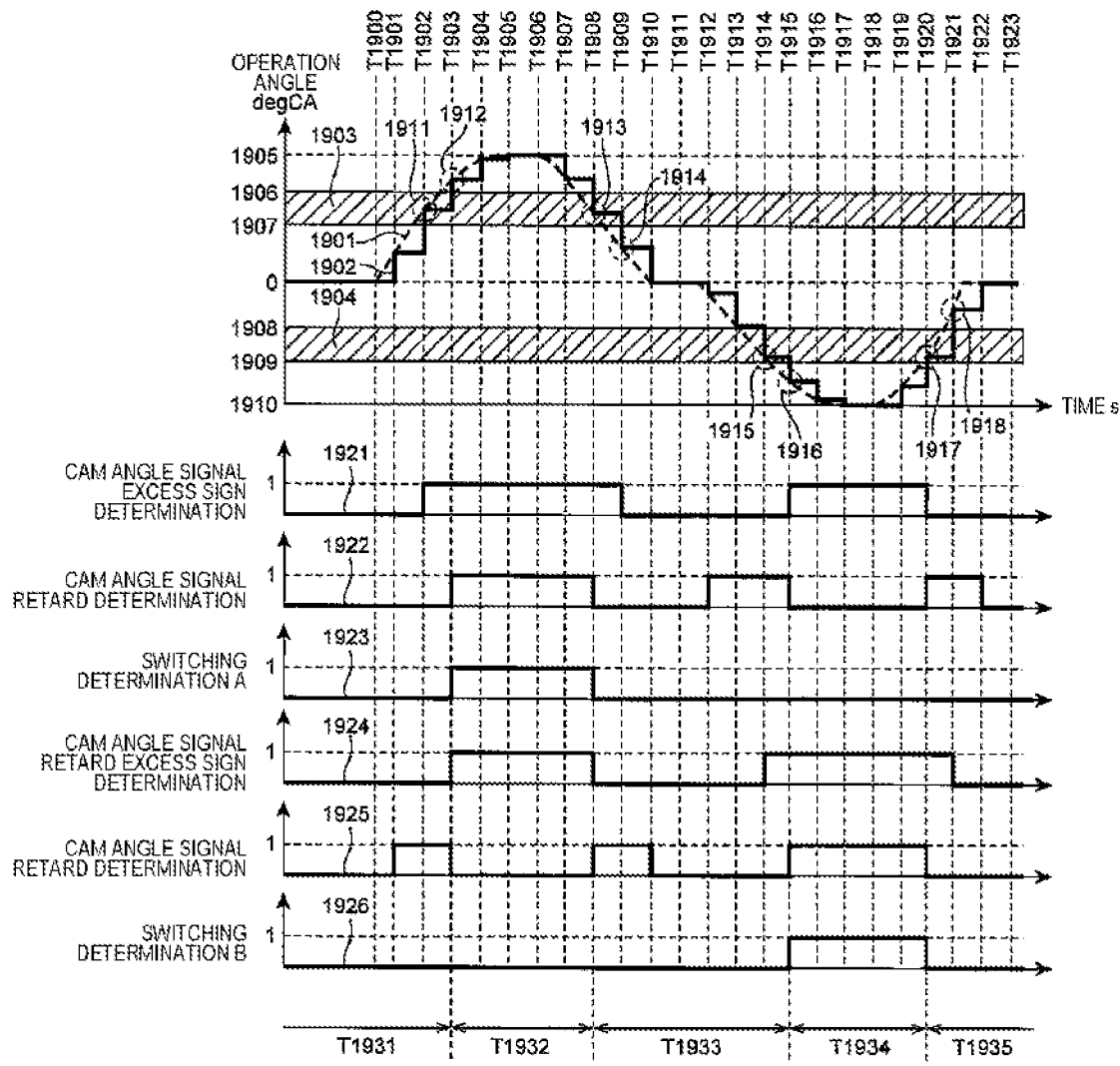
FIG. 19 is a graph illustrating a change in output of a cam angle excess determination unit according to an operation angle.

Next, each function of the cam angle excess determination unit will be described with reference to a timing chart of FIG. 19.

As an example, an operation of the camshaft assuming a case where the camshaft is advanced to the target operation angle 1905 exceeding the measurement reference position angle 1906, then retarded to the target operation angle 1910 exceeding the measurement reference position angle 1909, and returned to the initial position angle θ degCA is indicated as 1901. The operation of the variable valve mechanism is started from T1900, and the cam angle signal is detected at the timing of T1901 to T1923. The operation angle calculation result is represented as 1902.

The cam angle signal advance excess sign determination unit sets a cam angle signal advance excess sign determination value to 1 at T1902 when the cam angle signal is detected in the cam angle signal advance determination range 1903. The previous value is held while the cam angle is advanced beyond the measurement reference position angle 1906. At the time of movement from the target operation angle 1905 in the retard direction, the cam angle signal excess sign determination value is set to 1 at T1908 when the cam angle is detected in the cam angle signal advance determination range 1903. Since the cam angle signal is detected on the retard side of the cam angle signal advance determination range 1903 at T1909, the cam angle signal advance excess sign determination value is set to 0. Next, at T1915, the cam angle signal advance excess sign determination value is set to 1 because the cam angle signal advance determination range is also set on the retard side of the measurement reference position angle 1909.

The cam angle signal retard determination unit sets the cam angle signal retard determination value to 1 when the cam angle calculation unit calculates a value on the retard side from the initial position regardless of the operation direction of the camshaft. Therefore, T1903 to T1907, T1912 to T1914, and T1920 to T1922 are 1. When the cam angle calculation unit calculates a value on the advance side from the initial position, the cam angle signal retard determination value is set to 0.

When the cam angle signal advancement excess sign determination value 1921 is 1 and the cam angle signal retard determination value 1922 is 1, the switching determination unit A determines that the cam angle exceeds the measurement reference position angle 1906, and sets a switching determination A value 1923 to 1 for switching the operation angle expression. Therefore, in a section T1932 from T1903 to T1908, the switching determination A value is set to 1. Since the condition is not satisfied in the other sections T1931 and T1933 to T1935, the switching determination A value is set to 0.

The cam angle signal retard excess sign determination unit sets a cam angle signal retard excess sign determination value to 1 at T1914 when the cam angle signal is detected in the cam angle signal retard determination range 1904. The previous value is held while the cam angle is retarded beyond the measurement reference position angle 1909. At the time of movement from the target operation angle 1910 in the advance direction, the cam angle signal excess sign determination value is set to 1 at T1920 when the cam angle is detected in the cam angle signal retard determination range 1904. Since the cam angle signal is detected on the advance side of the cam angle signal advance determination range 1904 at T1921, the cam angle signal retard excess sign determination value is set to 0. The cam angle signal retard excess sign determination value is set to 1 also at T1912 because the cam angle signal retard determination range is also set on the advance side of the measurement reference position angle 1906.

The cam angle signal advance determination unit sets a cam angle signal advance determination value to 1 when the cam angle calculation unit calculates a value on the advance side from the initial position regardless of the operation direction of the camshaft. Therefore, T1901, T1902, T1908, T1909, and T1915 to T1919 are 1. When the cam angle calculation unit calculates a value on the retard side from the initial position, the cam angle signal advance determination value is set to 0.

When the cam angle signal retard excess sign determination value 1924 is 1 and the cam angle signal advance determination value 1925 is 1, the switching determination unit B determines that the cam angle exceeds the measurement reference position angle 1909 and sets the switching determination B value 1926 to 1 for switching the operation angle expression. Therefore, in a section T1934 from T1915 to T1920, the switching determination B value is set to 1. In the other sections T1931 to T1933 and T1935, since the condition is not satisfied, the switching determination B value is set to 0.

Next, a control flow of the cam angle signal retard excess sign determination unit will be described.

It is necessary to set a value when the cam angle is detected in the cam angle signal retard determination range to 1, and to maintain 1 when the cam angle is further retarded thereafter. On the other hand, when the detection is simply advanced from the initial position, it is necessary to maintain 0. That is, when the cam angle is detected on the advance side of the initial position, the previous value may be maintained.

Therefore, first, it is determined whether the calculated cam angle is smaller than the cam angle calculated at the initial position. When the value is small, the cam angle signal retard excess sign determination value remains the previous value without being changed.

On the other hand, when the cam angle is equal to or larger than the cam angle calculated at the initial position, next, it is determined whether the cam angle is within the cam angle signal retard determination range, that is, whether the cam angle is larger than the advance end of the cam angle signal retard determination range angle and smaller than the maximum angle in the cam angle measurement range. The cam angle signal retard excess sign determination value is set to 1 in the case of an angle falling within the cam angle signal retard determination range, and is set to 0 in the case of an angle not falling within the cam angle signal retard determination range. The cam angle signal advance excess sign determination unit will be omitted in the description of FIG. 12.

(Modifications) Next, a modification of the functional configuration of the operation angle calculation unit will be described.

Conventionally, regarding the calculation result of the cam angle calculation unit 205, the initial calculation value after engine start is stored in a cam angle (initial position) storage unit. However, since the cam angle at the initial position can be determined in advance by the mounting positional relationship between the cam plates 201 to 900 and the crank plate 214, the stored value of the cam angle (initial position) storage unit may be a fixed value.

Further, the operation angle calculation unit (conventional expression) calculates the operation angle by the conventional Expression (1) described in FIG. 3 from the relationship between the cam angle calculation result and the initial position cam angle.

In the present invention, in addition to the conventional configuration, a basic information storage unit, an advance conversion cam angle calculation unit, an advance operation angle calculation unit (conversion cam angle use expression), a retard conversion cam angle calculation unit, a retard operation angle calculation unit (conversion cam angle use expression), and an output value selection unit are newly added. The angle of the cam angle measurement range as indicated by T1811 in FIG. 18 is stored in advance in the basic information storage unit. As described with reference to FIGS. 6 and 18, the advance conversion cam angle calculation unit and the retard conversion cam angle calculation unit calculate the conversion cam angle by using the angle of the cam angle measurement range and the cam angle calculation result. As described with reference to FIG. 6, the advance operation angle calculation unit (conversion cam angle use expression) calculates the operation angle by adding the initial position cam angle and the conversion cam angle using the conversion cam angle use Expression (2). As described with reference to FIG. 18, the retard operation angle calculation unit (conversion cam angle use expression) calculates the operation angle by subtracting the initial position cam angle and the conversion cam angle using the conversion cam angle use Expression (3).

The output value selection unit outputs the calculation result of the operation angle calculation unit (conventional expression) when the results of the switching determination 1 and the switching determination 2 calculated by the cam angle excess determination unit are both 0, outputs the calculation result of the advance excess operation angle calculation unit (conversion cam angle use expression) when the result of the switching determination 1 is 1, and outputs the calculation result of the retard excess operation angle calculation unit (conversion cam angle use expression) when the result of the switching determination 2 is 1. In principle, the switching determination 1 and the switching determination 2 are not simultaneously 1. However, when the switching determination 1 and the switching determination 2 are simultaneously 1, the output value may be used as the calculation result of the operation angle calculation unit (conventional expression), or any operation angle value may not be output.

The operation angle calculation flow will be described. First, the conversion cam angle is calculated from the cam angle. Next, the operation angle according to the conventional Expression (1) is calculated from the cam angle. Next, the operation angle is calculated from the conversion cam angle using the conversion cam angle use Expressions (2) and (3).

Finally, based on the cam angle excess determination result, when the cam angle exceeds the measurement reference position angle in the advance direction, an advance operation angle calculation result using the conversion cam angle is output. When the cam angle exceeds the measurement reference position angle in the retard direction, the retard operation angle calculation result using the conversion cam angle is output. When the cam angle does not exceed the measurement reference position angle in either the advance direction or the retard direction, the calculation result of the operation angle calculation (conventional expression) is output as the operation angle.

A control device of the present invention (1) controls a variable valve mechanism of an internal combustion engine based on a crank angle signal and a cam angle signal. The control device includes: an operation angle calculation unit that calculates an initial cam angle from an interval between a cam angle measurement reference position in a cam angle measurement range and an initial cam angle signal detection position at an initial position of the variable valve mechanism, calculates an operation cam angle from an interval between the cam angle measurement reference position in the cam angle measurement range and an operation cam angle signal detection position at an operation position of the variable valve mechanism, and calculates an operation angle of the variable valve mechanism from a difference between the initial cam angle and the operation cam angle; and a cam angle excess determination unit that determines whether the operation cam angle signal detection position has moved to another cam angle measurement range adjacent to the cam angle measurement range beyond the cam angle measurement reference position by an operation of the variable valve mechanism. When the cam angle excess determination unit determines that the operation cam angle signal detection position has moved to another cam angle measurement range adjacent to the cam angle measurement range beyond the cam angle measurement reference position, the operation angle calculation unit calculates the operation angle based on an initial cam angle at an initial position of the variable valve mechanism and an operation cam angle of the another cam angle measurement range at an operation position of the variable valve mechanism.

In the control device of the present invention (2), the cam angle excess determination unit includes: a cam angle signal excess sign determination unit that determines whether the cam angle signal is detected in a cam angle signal determination range set as a range through which the operation cam angle signal detection position passes by an operation of the variable valve mechanism on a retard side of the cam angle measurement reference position within the cam angle measurement range; and a cam angle signal retard determination unit that determines whether the cam angle signal is detected on a retard side of an initial cam angle signal detection position in the cam angle measurement range. When the cam angle signal excess sign determination unit determines that the cam angle signal is detected in the cam angle signal determination range, and then the cam angle signal retard determination unit determines that the cam angle signal is detected on a retard side of an initial cam angle signal detection position in the cam angle measurement range, it is determined that the operation cam angle signal detection position has moved to another cam angle measurement range adjacent to the cam angle measurement range beyond the cam angle measurement reference position.

In the control device of the present invention (3), the cam angle excess determination unit includes: a cam angle signal advance excess sign determination unit that determines whether the cam angle signal is detected in a cam angle signal advance determination range set as a range through which the operation cam angle signal detection position passes by an operation of the variable valve mechanism on a retard side of the cam angle measurement reference position within the cam angle measurement range; a cam angle signal retard determination unit that determines whether the cam angle signal is detected on a retard side of an initial cam angle signal detection position in the cam angle measurement range; when the cam angle signal advance excess sign determination unit determines that the cam angle signal is detected in the cam angle signal advance determination range, and then the cam angle signal retard determination unit determines that the cam angle signal is detected on a retard side of an initial cam angle signal detection position in the cam angle measurement range, a cam angle signal retard excess sign determination unit that determines whether the cam angle signal is detected in a cam angle signal retard determination range set as a range through which the operation cam angle signal detection position passes by an operation of the variable valve mechanism on an advance side of the cam angle measurement reference position within the cam angle measurement range; and a cam angle signal advance determination unit that determines whether the cam angle signal is detected on an advance side of an initial cam angle signal detection position in the cam angle measurement range. When the cam angle signal retard excess sign determination unit determines that the cam angle signal is detected in the cam angle signal retard determination range, and then the cam angle signal advance determination unit determines that the cam angle signal is detected on an advance side of an initial cam angle signal detection position in the cam angle measurement range, it is determined that the operation cam angle signal detection position has moved to another cam angle measurement range adjacent to the cam angle measurement range beyond the cam angle measurement reference position.

In the control device according to (4) of the present invention, the cam angle measurement reference position is set at one or more positions at a 720 deg crank angle (degCA) based on the crank angle signal, the cam angle measurement range has an interval equal to or longer than an interval at which the cam angle signal is input in a retard direction from the cam angle measurement reference position, and the cam angle signal determination range has a width synchronized with an input speed of the cam angle signal.

In the control device of the present invention (5), the cam angle signal determination range is set in any one of a predetermined angular range and a time range from an advance end or a retard end of the cam angle measurement range or both ends thereof.

In the control device of the present invention (6), one of a predetermined angular range and a time range of the cam angle signal determination range is set to a range in which one or more cam angle signals are necessarily detected based on an operation speed of the variable valve mechanism, a cam angle signal input cycle, or an engine speed.

In the control device of the present invention (7), the operation angle calculation unit is configured to: calculate a first operation angle from a difference between the initial cam angle and the operation cam angle; calculate a second operation angle from a sum of the initial cam angle and a conversion cam angle obtained by converting an operation cam angle at an operation position of the variable valve into an advance direction value; calculate a third operation angle from a difference between the initial cam angle and a cam angle obtained by converting an operation cam angle at an operation position of the variable valve into a retard direction value; and calculate a third operation angle from a difference between the initial cam angle and a cam angle obtained by returning the operation cam angle at the operation position of the variable valve to the retard direction value. The first operation angle is output when the cam angle excess determination unit does not determine that the operation cam angle signal detection position has moved to another cam angle measurement range adjacent to the cam angle measurement range beyond the cam angle measurement reference position. The second operation angle or the third operation angle is output when the cam angle excess determination unit determines that the operation cam angle signal detection position has moved.

The present invention is not limited to the above embodiments. In addition, only control lines and information lines considered to be necessary for explanation are illustrated, but not all the control lines and the information lines for a product are illustrated. In practice, almost all the configurations may be considered to be connected to each other.

Hitherto, the embodiments of the invention have been described, but the invention is not limited to the embodiments. Various modifications may be made within a scope not departing from the spirit of the invention disclosed in claims. For example, the above-described embodiments of the invention have been described in detail in a clearly understandable way, and are not necessarily limited to those having all the described configurations. In addition, some of the configurations of a certain embodiment may be replaced with the configurations of the other embodiments, and the configurations of the other embodiments may be added to the configurations of the subject embodiment. In addition, some of the configurations of each embodiment may be omitted, replaced with other configurations, and added to other configurations.

REFERENCE SIGNS LIST

1101 actual camshaft operation angle
1102 operation angle calculation result
1103 cam angle signal determination range
1104 target operation angle
1105 measurement reference position for initial position (operation angle θ degCA)
1106 retard end of cam angle signal determination range
1121 cam angle signal excess sign determination
1122 cam angle signal retard determination
1123 switching determination
T1100 operation start timing of variable valve mechanism
T1101 to T1121 cam angle signal detection timing after start of operation of variable valve mechanism
T1131, T1133 area where operation angle is calculated by conventional operation angle calculation expression
T1132 region where operation angle is calculated by operation angle calculation expression using conversion cam angle

The invention claimed is:

1. A control device that controls a variable valve mechanism of an internal combustion engine based on a crank angle signal and a cam angle signal, the control device comprising:
    an operation angle calculation unit that: i) calculates an initial cam angle from an interval between a cam angle measurement reference position in a cam angle measurement range and an initial cam angle signal detection position at an initial position of the variable valve mechanism, ii) calculates an operation cam angle from an interval between the cam angle measurement reference position in the cam angle measurement range and an operation cam angle signal detection position at an operation position of the variable valve mechanism, and iii) calculates an operation angle of the variable valve mechanism from a difference between the initial cam angle and the operation cam angle; and
    a cam angle excess determination unit that determines whether the operation cam angle signal detection position has moved to another cam angle measurement range adjacent to the cam angle measurement range beyond the cam angle measurement reference position by an operation of the variable valve mechanism, wherein
    when the cam angle excess determination unit determines that the operation cam angle signal detection position has moved to another cam angle measurement range adjacent to the cam angle measurement range beyond the cam angle measurement reference position, the operation angle calculation unit calculates the operation angle based on the initial cam angle at the initial position of the variable valve mechanism and the operation cam angle of the another cam angle measurement range at an operation position of the variable valve mechanism;
    wherein the variable valve mechanism controls a camshaft of the internal combustion engine to a target angle based on the operation angle calculated by the operation angle calculation unit.

2. The control device according to claim 1, wherein the cam angle excess determination unit includes:
    a cam angle signal excess sign determination unit that determines whether the cam angle signal is detected in a cam angle signal determination range set as a range through which the operation cam angle signal detection position passes by the operation angle of the variable valve mechanism on a retard side of the cam angle measurement reference position within the cam angle measurement range; and
    a cam angle signal retard determination unit that determines whether the cam angle signal is detected on a retard side of the initial cam angle signal detection position in the cam angle measurement range, and when the cam angle signal excess sign determination unit determines that the cam angle signal is detected in the cam angle signal determination range, and then the cam angle signal retard determination unit determines that the cam angle signal is detected on the retard side of the initial cam angle signal detection position in the cam angle measurement range, it is determined that the operation cam angle signal detection position has moved to another cam angle measurement range adjacent to the cam angle measurement range beyond the cam angle measurement reference position.

3. The control device according to claim 2, wherein the cam angle measurement reference position is set at one or more positions at a 720 deg crank angle (degCA) based on the crank angle signal, the cam angle measurement range has an interval equal to or longer than an interval at which the cam angle signal is input in a retard direction from the cam angle measurement reference position, and the cam angle signal determination range has a width synchronized with an input speed of the cam angle signal.

4. The control device according to claim 2, wherein the cam angle signal determination range is set in any one of a predetermined angular range and a time range from an advance end or a retard end of the cam angle measurement range or both ends thereof.

5. The control device according to claim 4, wherein the one of the predetermined angular range and the time range of the cam angle signal determination range is set with a range in which one or more cam angle signals are necessarily detected based on an operation speed of the variable valve mechanism, a cam angle signal input cycle, or an engine speed.

6. The control device according to claim 2, wherein the operation angle calculation unit is configured to:

calculate a first operation angle from a difference between the initial cam angle and the operation cam angle; and calculate a second operation angle from a sum of the initial cam angle and a conversion cam angle obtained by converting the operation cam angle at the operation position of the variable valve mechanism into an advance direction value, and calculate a third operation angle from a difference between the initial cam angle and the conversion cam angle obtained by converting the operation cam angle at the operation position of the variable valve mechanism into a retard direction value, output the first operation angle when the cam angle excess determination unit does not determine that the operation cam angle signal detection position has moved to another cam angle measurement range adjacent to the cam angle measurement range beyond the cam angle measurement reference position, and output the second operation angle or the third operation angle when the cam angle excess determination unit determines that the operation cam angle signal detection position has moved.

7. The control device according to claim 1, wherein the cam angle excess determination unit includes:

a cam angle signal advance excess sign determination unit that determines whether the cam angle signal is detected in a cam angle signal advance determination range set as a range through which the operation cam angle signal detection position passes by the operation angle of the variable valve mechanism on a retard side of the cam angle measurement reference position within the cam angle measurement range;

a cam angle signal retard determination unit that determines whether the cam angle signal is detected on a retard side of the initial cam angle signal detection position in the cam angle measurement range, wherein when the cam angle signal advance excess sign determination unit determines that the cam angle signal is detected in the cam angle signal advance determination range, the cam angle signal retard determination unit determines that the cam angle signal is detected on the retard side of the initial cam angle signal detection position in the cam angle measurement range, a cam angle signal retard excess sign determination unit that determines whether the cam angle signal is detected in a cam angle signal retard determination range set as a range through which the operation cam angle signal detection position passes by the operation angle of the variable valve mechanism on an advance side of the cam angle measurement reference position within the cam angle measurement range; and a cam angle signal advance determination unit that determines whether the cam angle signal is detected on an advance side of the initial cam angle signal detection position in the cam angle measurement range, wherein when the cam angle signal retard excess sign determination unit determines that the cam angle signal is detected in the cam angle signal retard determination range, and then the cam angle signal advance determination unit determines that the cam angle signal is detected on the advance side of the initial cam angle signal detection position in the cam angle measurement range, it is determined that the operation cam angle signal detection position has moved to another cam angle measurement range adjacent to the cam angle measurement range beyond the cam angle measurement reference position.

* * * * *